United States Patent
Sugaki et al.

(10) Patent No.: US 10,471,596 B2
(45) Date of Patent: Nov. 12, 2019

(54) ROBOT ARM AND UNMANNED AERIAL VEHICLE EQUIPPED WITH THE ROBOT ARM

(71) Applicant: PRODRONE CO., LTD., Nagoya-shi, Aichi (JP)

(72) Inventors: Kiyokazu Sugaki, Nagoya (JP); Kazuo Ichihara, Nagoya (JP)

(73) Assignee: PRODRONE CO., LTD., Nagoya (JP)

( * ) Notice: Subject to any disclaimer, the term of this patent is extended or adjusted under 35 U.S.C. 154(b) by 0 days.

(21) Appl. No.: 16/301,719

(22) PCT Filed: Jan. 12, 2017

(86) PCT No.: PCT/JP2017/000724
§ 371 (c)(1),
(2) Date: Nov. 14, 2018

(87) PCT Pub. No.: WO2018/042692
PCT Pub. Date: Mar. 8, 2018

(65) Prior Publication Data
US 2019/0314990 A1 Oct. 17, 2019

(30) Foreign Application Priority Data
Sep. 2, 2016 (JP) .................................. 2016-171917

(51) Int. Cl.
*G06F 19/00* (2018.01)
*B25J 9/16* (2006.01)
(Continued)

(52) U.S. Cl.
CPC .............. *B25J 9/1666* (2013.01); *B25J 5/00* (2013.01); *B25J 15/08* (2013.01); *B64C 39/024* (2013.01);
(Continued)

(58) Field of Classification Search
CPC .. B25J 9/1666; B25J 15/08; B25J 5/00; B64C 39/024; B64C 2201/128; B64C 2201/027; B64D 1/00
See application file for complete search history.

(56) References Cited

U.S. PATENT DOCUMENTS

| 2007/0146371 | A1* | 6/2007 | Dariush | ................. | B25J 9/1602 |
|---|---|---|---|---|---|
| | | | | | 345/474 |
| 2007/0162164 | A1* | 7/2007 | Dariush | ................. | B25J 9/1602 |
| | | | | | 700/61 |

(Continued)

FOREIGN PATENT DOCUMENTS

| JP | H05-046872 U | 6/1993 |
|---|---|---|
| JP | H07-024751 A | 1/1995 |

(Continued)

OTHER PUBLICATIONS

Mar. 28, 2017 International Search Report issued in International Patent Application No. PCT/JP2017/000724.

(Continued)

*Primary Examiner* — Ian Jen
(74) *Attorney, Agent, or Firm* — Oliff PLC

(57) ABSTRACT

A robot arm that can be suitably used in aerial vehicles and an unmanned aerial vehicle equipped with the robot arm. The robot arm includes: an arm unit includes a plurality of joints; arm controlling means for controlling driving of the joints; and a displacement detector configured to detect a change of a position and inclination of the arm unit. The arm unit has a base end connected to the aerial vehicle. At least a leading end of the arm unit is exposed to an outside of the aerial vehicle. When the displacement detector has detected a position error that is an unexpected change of the position or inclination of the arm unit, the arm unit controlling means is configured to cause the joints to absorb the position error (Continued)

so as to prevent the position error from being transmitted to a side of the leading end of the arm unit.

15 Claims, 14 Drawing Sheets

(51) Int. Cl.
    *B25J 5/00*         (2006.01)
    *B25J 15/08*       (2006.01)
    *B64D 1/00*       (2006.01)
    *B64C 39/02*      (2006.01)

(52) U.S. Cl.
    CPC .......... *B64D 1/00* (2013.01); *B64C 2201/027* (2013.01); *B64C 2201/128* (2013.01)

(56) References Cited

U.S. PATENT DOCUMENTS

| | | | |
|---|---|---|---|
| 2007/0233280 A1* | 10/2007 | Bacon | B25J 9/1605 700/1 |
| 2013/0310973 A1 | 11/2013 | Tanaka et al. | |
| 2016/0169772 A1 | 6/2016 | Olmedo et al. | |
| 2016/0236346 A1* | 8/2016 | Lee | B25J 9/10 |
| 2017/0305526 A1* | 10/2017 | Thomassey | B64C 3/56 |
| 2018/0134369 A1* | 5/2018 | Tian | B64C 1/30 |
| 2019/0002127 A1* | 1/2019 | Straus | B64C 39/024 |
| 2019/0135419 A1* | 5/2019 | Fisher | B64C 27/006 |

FOREIGN PATENT DOCUMENTS

| | | |
|---|---|---|
| JP | H09-142347 A | 6/1997 |
| JP | H10-240323 A | 9/1998 |
| JP | H11-157497 A | 6/1999 |
| JP | 2004-017722 A | 1/2004 |
| JP | 2004-242128 A | 8/2004 |
| JP | 2007-050871 A | 3/2007 |
| JP | 2011-143494 A | 7/2011 |
| JP | 2012-139762 A | 7/2012 |
| JP | 2013-052490 A | 3/2013 |
| JP | 2013-094948 A | 5/2013 |
| JP | 2014-198369 A | 10/2014 |
| JP | 2015-062991 A | 4/2015 |

OTHER PUBLICATIONS

Translation of the Preliminary Report on Patentability issued in International Patent Application No. PCT/JP2017/000724.

\* cited by examiner

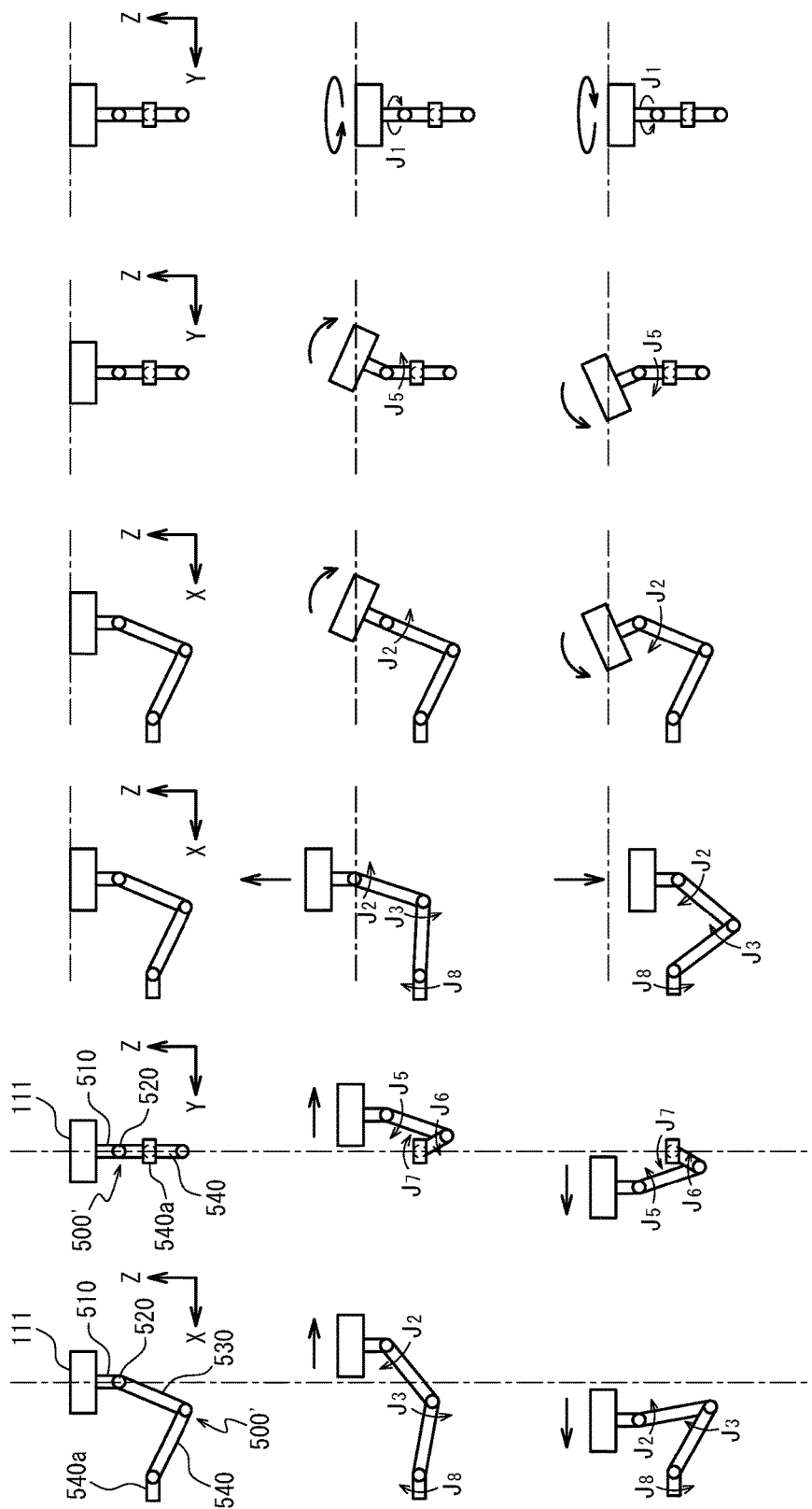

ROBOT ARM AND UNMANNED AERIAL VEHICLE EQUIPPED WITH THE ROBOT ARM

TECHNICAL FIELD

The present invention relates to a robot arm mounted on an aerial vehicle.

BACKGROUND ART

Conventional small-size unmanned aerial vehicles represented by industrial unmanned helicopters have had airframes too expensive to be affordable. Also, these vehicles used to require skillful pilotage for stable flight. In recent years, however, there have been improvements and cost reductions in sensors and software used to control posture of unmanned aerial vehicles and to implement autonomous flight of unmanned aerial vehicles. This has led to considerable improvement in manipulability of unmanned aerial vehicles. In particular, small size multi-copters are simpler in rotor structure and easier in design and maintenance than helicopters. Under the circumstances, small size multi-copters are not only used for hobbyist purposes but also applied to various missions in a wide range of fields.

CITATION LIST

Patent Literature

PTL1: JP 2012-139762A

SUMMARY OF INVENTION

Technical Problem

As the application range of multi-copters are becoming wider, the level of difficulty of work to be performed by multi-copters are becoming higher. There is a need for an airframe that is capable of performing more complicated and more precise work of a higher quality. In order to fulfill this need, it is possible to make the structure of an airframe of a multi-copter dedicated to a single kind of work and to, when performing a particular kind work, use a multi-copter dedicated to the particular kind work. It is occasionally preferable, however, that a single airframe is capable of performing various kinds of work of a comparatively high quality. A possible means of realizing such general-purpose multi-copter is to mount a robot arm in the multi-copter and preparing interchangeable end effectors to deal with various kinds of work.

In light of the above-described problems, a problem to be solved by the present invention is to provide a robot arm that can be suitably used in aerial vehicles and to provide an unmanned aerial vehicle equipped with the robot arm.

Solution to Problem

In order to solve the above-described problem, a robot arm according to the present invention is mountable on an aerial vehicle and includes: an arm unit includes a plurality of joints; arm controlling means for controlling driving of the joints; and a displacement detector configured to detect a change of a position of the arm unit and an inclination of the arm unit. The arm unit has a base end connected to the aerial vehicle. At least a leading end of the arm unit is exposed to an outside of the aerial vehicle. When the displacement detector has detected a position error that is an unexpected change of the position of the arm unit or an unexpected inclination of the arm unit, the arm unit controlling means is configured to cause the joints to absorb the position error so as to prevent the position error from being transmitted to a side of the leading end of the arm unit.

In applications where a robot arm is mounted on an aerial vehicle, there is such a problem that, due to the unique characteristic of an aerial vehicle that it flies in the air, it is difficult to stabilize the position of the robot arm. The robot arm according to the present invention includes arm controlling means so that the arm controlling means automatically corrects a position error of the arm unit. This stabilizes the leading-end position of the arm unit in the air, that is, the position of the end effector mounted on the arm unit. This, in turn, increases the quality of the work performed by the robot arm mounted on the aerial vehicle.

The aerial vehicle may preferably be an unmanned aerial vehicle having a plurality of rotary wings.

By mounting the robot arm according to the present invention on an unmanned rotary-wing vehicle capable of making hovering motion, the robot arm can be remotely controlled to perform more complicated and a wider range of kinds of work than the work performed by fixed-wing vehicles.

The arm controlling means may preferably prevent the position error from being transmitted to the side of the leading end of the arm unit.

With the configuration in which the arm controlling means stabilizes the position of the leading end of the arm unit in the air, all the joints of the arm unit can be used to absorb a position error. This further stabilizes the position of the end effector mounted on the arm unit. This, in turn, further increases the quality of the work performed by the robot arm mounted on the aerial vehicle.

The displacement detector may be disposed on an inside of the aerial vehicle or at the base end of the arm unit.

By arranging the displacement detector on the inside of the aerial vehicle or at the base end of the arm unit, the displacement of the airframe of the aerial vehicle is accurately detected. This configuration also makes it easier to cause an inertia measurement device equipped in advance in the airframe of the aerial vehicle to double as a controller for the posture of the arm unit.

Also, the displacement detector may be disposed at the leading end of the arm unit.

With the configuration in which the displacement detector is disposed at the leading end of the arm unit, the displacement of the end effector mounted on the arm unit can be directly detected. This ensures that a position error is absorbed more accurately.

Two of the plurality of joints swingable in directions orthogonal to each other may preferably be regarded as a pair of the joints, and the plurality of joints may preferably include three pairs of the joints.

Thus, the plurality of joints of the arm unit include three pairs of joints, each pair including two joints swingable in directions orthogonal to each other. This enables the joints to absorb a position error of the airframe of the aerial vehicle caused by: its movement in the front and/or rear directions, the right and/or left directions, and the upward and/or downward directions; an inclination of the airframe; and even a combination of the foregoing. This prevents a position error from being transmitted to the leading end of the arm unit.

The arm unit may preferably include a plurality of link members connected to each other with the plurality of joints.

The plurality of link members include, from the base end of the arm unit toward the leading end of the arm unit: a base connected to an airframe of the aerial vehicle; a shoulder; an upper arm; a lower arm; and a wrist that serves as the leading end of the arm unit. The shoulder may be connected to the base rotatably in a circumferential direction relative to the base. The shoulder and the upper arm, the upper arm and the lower arm, and the lower arm and the wrist may be connected to each other with two of the joints swingable in directions orthogonal to each other.

Thus, three pairs of joints each pair of which are swingable in directions orthogonal to each other are arranged at suitable positions in the arm unit, and further, there are joints capable of absorbing a rotation of the airframe. This enables the joints to absorb a position error of the airframe of the aerial vehicle caused by: its movement in the front and/or rear directions, the right and/or left directions, and the upward and/or downward directions; an inclination of the airframe; a rotation of the airframe; and even a combination of the foregoing. This prevents a position error from being transmitted to the wrist.

The robot arm may further include an end effector mounted on the leading end of the arm unit. The end effector may include image picking-up means for picking up an image of a work target of the end effector.

Thus, the end effector includes image picking-up means for picking up an image of a work target of the end effector. This enables the operator of the unmanned aerial vehicle to perform work while checking an image at hand. This further increases the quality of the work performed by the robot arm mounted on the unmanned aerial vehicle.

The robot arm may further include an end effector mounted on the leading end of the arm unit. The end effector may include distance measuring means for measuring a distance to a work target of the end effector.

Thus, the end effector includes distance measuring means for measuring the distance between the end effector and the work target of the end effector. This enables the operator of the unmanned aerial vehicle to accurately recognize the distance between the end effector and the work target of the end effector in the form of a value. This, in turn, further increases the quality of the work performed by the robot arm mounted on the unmanned aerial vehicle.

The robot arm may preferably further include: an end effector mounted on the leading end of the arm unit; distance measuring means for measuring a distance to an object existing around an airframe of the aerial vehicle; and obstacle avoiding means for controlling a posture of the arm unit to avoid a collision between an obstacle detected by the distance measuring means, and the arm unit and the end effector.

Thus, the obstacle avoiding means automatically avoids a collision between the arm unit and/or the end effector and an obstacle. This prevents collision accidents without relying on the operator's pilotage.

The robot arm may further include storing means for storing information with which a current posture of the arm unit is identifiable. Based on the information stored in the storing means, the obstacle avoiding means may be configured to determine whether the object detected by the distance measuring means is the obstacle, the arm, or the end effector.

The distance measuring means measures a range around the airframe of the aerial vehicle, and if the arm unit takes a particular posture, part of the arm unit and/or the end effector may be included within the measured range. If the obstacle avoiding means has erroneously determined the arm unit and/or another element as an obstacle, the arm unit and/or another element avoids itself, resulting in a diminished movable range. This may make the arm unit uncontrollable. By employing storing means for storing the current posture of the arm unit, the obstacle avoiding means is able to determine whether the object detected by the distance measuring means is an obstacle, the arm unit, or the end effector. This prevents the above-described failure.

When the object is gradually approaching the distance measuring means from a distance within a measured range of the distance measuring means, the obstacle avoiding means may be configured to determine the object as the obstacle. When the object has suddenly appeared in the measured range of the distance measuring means, the obstacle avoiding means may be configured to determine the object as the arm or the end effector.

The determination as to whether the object is an obstacle, the arm unit, or the end effector is made based on how the object appears in the measured range measured by the measuring means. This ensures that the determination can be made using a simple condition.

The arm unit may preferably include a plurality of link members connected to each other with the plurality of joints. at least one joint among the plurality of joints may include a reinforcement joint including: a driving source configured to drive the at least one joint; a tapered member; and a connection member. The driving source may be disposed in a first link member that is one link member among the plurality of link members. The tapered member may be mounted on an output shaft of the driving source. A first tapered portion may be formed on an outer surface of the tapered member. The first tapered portion may have an approximately truncated cone shape such that an outer diameter dimension of the shape gradually decreases from a base end of the output shaft toward a leading end of the output shaft in an axis direction of the output shaft. The connection member may include a second tapered portion having a shape complementary to the shape of the first tapered portion. The first tapered portion of the tapered member may be engaged with the second tapered portion of the connection member. The connection member may be fastened to the tapered member with a screw. The connection member may be fixed to a second link member that is another link member among the link members and that is next to the first link member.

Each of the plurality of joints of the arm unit needs to have a capability of supporting the weight of the portion of the arm unit ahead of the joint. By making the joints reinforcement joints, the second link member can be supported while the stress acting on the output shaft of the servo motor, which is a driving source, is dispersed to other portions. This ensures that the weight of the arm unit and the weight of the end effector mounted on the arm unit are stably supported by the joints.

The reinforcement joint may preferably further include a bearing member. An outer surface of the connection member may be rotatably supported by the bearing member. The bearing member may be fixed to the first link member.

Thus, the connection member is supported by a bearing member. This ensures that the reinforcement joint is rotated and swung more smoothly. swing The arm unit may include a plurality of link members connected to each other with the plurality of joints. At least one link member among the plurality of link members may include a plate material made of a CFRP (Carbon Fiber Reinforced Plastics). The at least one link member may have a skeleton shape with an internal substance reduced to a framework.

Thus, a link member has a frame structure made of CFRP. This promotes the attempt to maintain the rigidity of the link member and make the link member lighter in weight at the same time. This makes the robot arm according to the present invention more suitable for use in aerial vehicles.

The robot arm may preferably further include an end effector mounted on the leading end of the arm unit. The end effector may include a pair of claws that form a ring shape when the pair of claws are closed. At least one of the pair of claws may include a movable claw rotationally movable about a base end of the at least one claw. The pair of claws may be openable and closable at leading ends of the pair of claws by rotationally moving the movable claw. The leading ends of the pair of claws may be located at different positions in a thickness direction of the pair of claws. When the pair of claws are closed, the leading ends of the pair of claws may be overlapped with each other in a circumferential direction of the ring shape. Depressions may be located at portions of the leading ends of the pair of claws that correspond to an inner portion of the ring shape, the depressions being depressed outward on the ring shape. The depressions may be located at same positions in the circumferential direction of the ring shape.

The pair of claws have depressions at the leading ends of the claws, and when the pair of claws are closed, the depressions are located at the same positions in the ring direction of the pair of claws. With this configuration, in suspending and supporting a heavy object using, for example, a wire or a handle, it is possible to hang the wire or the handle on the depressions. The load of the heavy object causes the leading ends of the pair of claws to be unseparatably locked together. This prevents the pair of claws from being unintentionally opened while the claws are carrying the heavy object.

at least one joint among the plurality of joints may include a servo motor serving as a driving source configured to swing the at least one joint. While the unmanned aerial vehicle is making a horizontal flight, the arm controlling means may be configured to: orient a swaying motion control joint such that the swaying motion control joint is swingable in a direction in which the unmanned aerial vehicle progresses, the swaying motion control joint being one of the joints and including the servo motor; and orient a suspending support portion of the arm unit downward in a linear manner from the swaying motion control joint, the suspending support portion being located at a side of the leading end of the arm unit relative to the swaying motion control joint. Upon stopping of the horizontal flight of the unmanned aerial vehicle, the arm controlling means may be configured to gradually increase a holding property of the servo motor of the swaying motion control joint so as to quickly alleviate a swaying motion of the suspending support portion.

Thus, the arm unit includes a swaying motion control joint. This prevents, when the unmanned aerial vehicle stops, a swaying motion of the suspending support portion and a piece of freight supported by the suspending support portion.

Also in order to solve the above-described problem, an unmanned aerial vehicle according to the present invention includes a plurality of rotary wings and the robot arm according to the present invention.

Advantageous Effects of Invention

Thus, the robot arm according to the present invention can be suitably used for aerial vehicles; in particular, the robot arm can be suitably used for an unmanned aerial vehicle having a plurality of rotary wings.

BRIEF DESCRIPTION OF DRAWINGS

FIGS. 5A to 5F are schematics illustrating a method of maintaining a posture of a wrist of the modification of the arm unit.

DESCRIPTION OF EMBODIMENTS

An embodiment of the robot arm according to the present invention will be described below by referring to the accompanying drawings. The embodiment that will be described below is an example in which the robot arm according to the present invention is mounted on a multi-copter, which is one kind of unmanned aerial vehicle having a plurality of rotary wings. In the following description, the terms "up" and "down" refer to the vertical directions in FIG. 1, which are directions parallel to the Z axis direction in the coordinate system representation in FIG. 1. Also, the term "horizontal" refers to the X-Y plane directions of the coordinate system representation. The terms "front" and "rear" respectively refer to the front and rear directions in FIG. 1, which are directions parallel to the X axis direction in the coordinate system representation in FIG. 1. The terms "right" and "left" respectively refer to the right and left directions as seen by the reader of FIG. 1, which are directions parallel to the Y axis direction in the coordinate system representation in FIG. 1.

First Embodiment (General Arrangement Outline)

Figure 1:
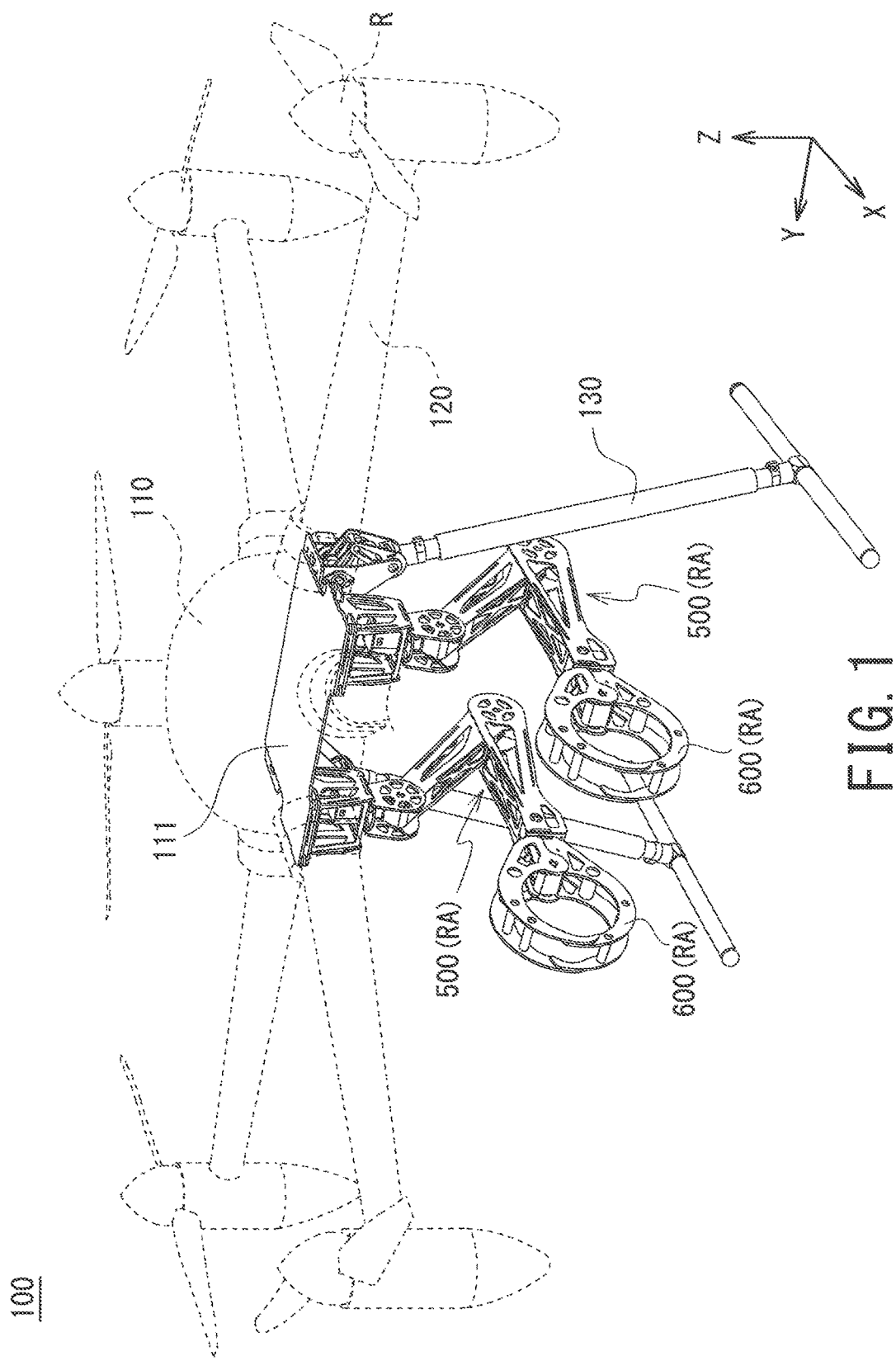
FIG. 1 is a see-through perspective view of a multi-copter according to a first embodiment illustrating its exterior appearance.

FIG. 1 is a see-through perspective view of a multi-copter 100 according to this embodiment illustrating its exterior appearance. The multi-copter 100 includes six rotor supports 120, which extend in horizontal directions from an airframe center portion 110 of the multi-copter 100. The rotor supports 120 are arranged at equal intervals in a circumferential direction of the multi-copter 100 around the airframe center portion 110, and radially extend from the airframe center portion 110. A rotor R, which is a rotary wing, is located at the leading end of each rotor support 120. There is no particular limitation to the number of rotors of the multi-copter 100; the number of rotors may be determined considering the application in which the multi-copter 100 is used, required flight stability, cost tolerated, and other considerations. As necessary, the multi-copter may be changed to: a helicopter, has two rotors; an octocopter, which has eight rotors; and even a multi-copter having more than eight rotors.

The airframe center portion 110 includes, at its lower portion, an adapter plate 111, on which various attachments are mountable. On the adapter plate 111, two arm units 500 are mounted. The arm units 500 constitute robot arms RA according to this embodiment. The two arm units 500 are entirely exposed to the outside of the airframe. The arm units 500 have identical structures. At the leading end of each of the arm units 500, a hand 600 is attached. The hand 600 corresponds to the end effector of each robot arm RA according to this embodiment. It is to be noted that the end effector used in the present invention will not be limited to the hand 600; it is possible to use any other end effectors designed for a variety of applications, examples including a welder, a screw fastening device, a hole opener, a coating device, and even a photographing device.

Further to the adapter plate 111, a pair of skids 130 are connected as landing devices for the multi-copter 100. The multi-copter 100 illustrated in FIG. 1 is in landing state, and the skids 130 are arranged so that the skids 130 are approximately perpendicular to the ground. It is to be noted that the skids 130 according to this embodiment are retractable landing gears; when the multi-copter 100 makes a flight, the skids 130 are bent horizontally outward about the base ends of the skids 130 by servo motors, not illustrated, and are supported in parallel with the rotor supports 120. When the multi-copter 100 lands, the skids 130 are returned to the arrangement illustrated in FIG. 1 by the servo motors. This prevents the skids 130 from limiting the movable ranges of the arm units 500 while the multi-copter 100 is flying. It is to be noted that the skids 130 is not an essential configuration and may be omitted.

(Structure of Arm Unit)

Figure 2:
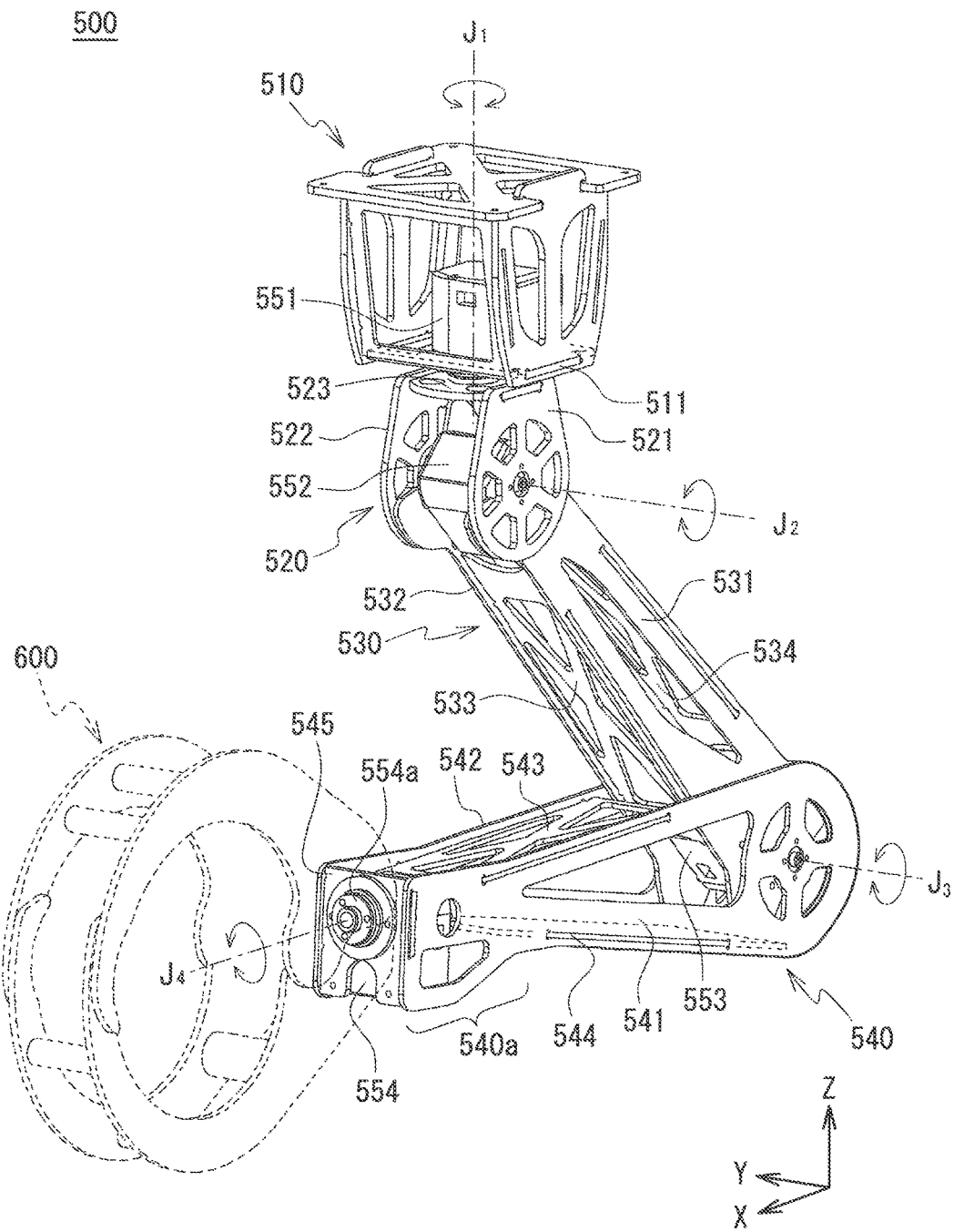
FIG. 2 is a perspective view of a structure of an arm unit.

FIG. 2 is a perspective view of a structure of each arm unit 500. The arm unit 500 and the hand 600 according to this embodiment constitute a vertical multi-articular manipulator. It is to be noted that the term "arm unit" as used in the present invention does not include the end effector, such as the hand 600. The arm unit 500 includes four link members, which are, from the base end of the arm unit 500 toward the leading end of the arm unit 500: a base 510; a shoulder 520; an upper arm 530; and a lower arm 540 (these link members will be hereinafter collectively referred to as "link members 510 to 540"). These link members 510 to 540 are connected to each other through four joints, which are a shoulder rotation axis $J_1$, an upper-arm swinging axis $J_2$, a lower-arm swinging axis $J_3$, and a wrist rotation axis $J_4$ (these joints will be collectively referred to as "joints $J_1$ to $J_4$"). The joints $J_1$ to $J_4$ respectively include servo motors 551 to 554. By driving the servo motors 551 to 554, the rotational angle and the swinging angle of the joints $J_1$ to $J_4$ are adjusted. It is to be noted that the driving sources of the joints according to the present invention will not be limited to servo motors; any other driving means may be used insofar as these joints are adjustable to any desired rotational and swinging angles.

Among the link members 510 to 540, the base 510 corresponds to the base end of the arm unit 500 and is mounted on the adapter plate 111 (FIG. 1), so that the position of the base 510 is fixed to the adapter plate 111. To the base 510, the shoulder 520 is connected, and the shoulder 520 is rotatable about the shoulder rotation axis $J_1$ in its circumferential directions. To the shoulder 520, the upper arm 530 is connected, and the upper arm 530 is swingable about the upper-arm swinging axis $J_2$ in the vertical directions. To the upper arm 530, the lower arm 540 is connected, and the lower arm 540 is swingable about the lower-arm swinging axis $J_3$ in the vertical directions. To the lower arm 540, the hand 600 is connected, and the hand 600 is rotatable about the wrist rotation axis $J_4$ in its circumferential directions.

Each of the link members 510 to 540 according to this embodiment is a plate material made of CFRP (hereinafter referred to as "CFRP plate"). As illustrated in FIG. 2, each of the link members 510 to 540 has a skeleton shape with an internal substance reduced to a framework. This configuration is an attempt to make the arm unit 500 according to this embodiment lightweight and rigid at the same time. This makes the arm unit 500 a suitable configuration to be mounted on the multi-copter 100.

The base 510 is a link member formed in an approximately box shape. The servo motor 551, which constitutes the shoulder rotation axis $J_1$, is located inside the base 510. The shaft structure, not illustrated, of the servo motor 551 penetrates a bottom plate 511 of the base 510 in the downward direction.

The shoulder 520 is a laid U-shape link member, and includes: two side plates 521 and 522, which are arranged in parallel with each other; and a top plate 523, which is arranged perpendicularly to the plate surfaces of the side plates 521 and 522. The side plates 521 and 522 are arranged with their plate surfaces oriented in horizontal directions. The top plate 523 supports the upper edges of the side plates 521 and 522. The top plate 523 is connected with the shaft structure, not illustrated, of the servo motor 551. This enables the shoulder 520 to rotate about the shoulder rotation axis $J_1$ in its circumferential directions.

The upper arm 530 is an approximately rectangular cylindrical link member, and includes: two side plates 531 and 532, which are arranged in parallel with each other; and diagonal-braced side plates 533 and 534, which connect the short-side edges of the side plates 531 and 532 to each other. The outer surfaces of the side plates 531 and 532 of the upper arm 530 near its base end are respectively in contact with the inner surfaces of the side plates 521 and 522 of the shoulder 520. A servomotor 552, which constitutes the upper-arm swinging axis $J_2$, is located inside the base end of the upper arm 530. The shaft structure, not illustrated, of the servo motor 552 penetrates the side plates 531 and 532 of the upper arm 530 in their thickness directions, and is connected to the side plates 521 and 522 of the shoulder 520. This enables the upper arm 530 to swing about the upper-arm swinging axis $J_2$ in the vertical directions.

The lower arm 540 is an approximately rectangular cylindrical link member, and includes: two side plates 541 and 542, which are arranged in parallel with each other; and diagonal-braced side plates 543 and 544, which connect the short-side edges of the side plates 541 and 542 to each other. The inner surfaces of the side plates 541 and 542 of the lower arm 540 near its base end are respectively in contact with the outer surfaces of the side plates 531 and 532 of the upper arm 530 near its leading end. A servo motor 553, which constitutes the lower-arm swinging axis $J_3$, is located inside the leading end of the upper arm 530. The shaft structure, not illustrated, of the servo motor 553 penetrates the side plates 531 and 532 of the upper arm 530 in their thickness directions, and is connected to the side plates 541 and 542 of the lower arm 540. This enables the lower arm 540 to swing about the lower-arm swinging axis $J_3$ in the vertical directions.

The leading end of the lower arm 540 according to this embodiment and a vicinity portion of the lower arm 540 located near the leading end constitute a wrist 540a, which is integral with the lower arm 540. The wrist 540a corresponds to the leading end of the arm unit 500. At the leading end of the wrist 540a, a front plate 545 is located. The front plate 545 is arranged perpendicularly to the plate surfaces of the side plates 541 and 542. A servo motor 554, which constitutes the wrist rotation axis $J_4$, is located on the front plate 545. The shaft structure, 554a, of the servo motor 554 extends forward through the front plate 545. The hand 600 is mounted on the shaft structure 554a, and this enables the hand 600 to rotate about the wrist rotation axis $J_4$ in its circumferential directions.

(Reinforcement Structure of Joint)

Each of the joints $J_1$ to $J_4$ of the arm unit 500 needs to support the weight of the portion of the arm unit 500 ahead of each of the joints $J_1$ to $J_4$. More specifically, the output shafts of the servo motors 551 to 554, which respectively constitute the joints $J_1$ to $J_4$, need to be strong enough to support the weights of the elements located between the servo motors 551 to 554 and the hand 600; namely, the weights of the link members 520 to 540, the weights of the servo motors 552 to 554, the weight of the hand 600, and even the load of the object lifted by the hand 600.

Figure 3:
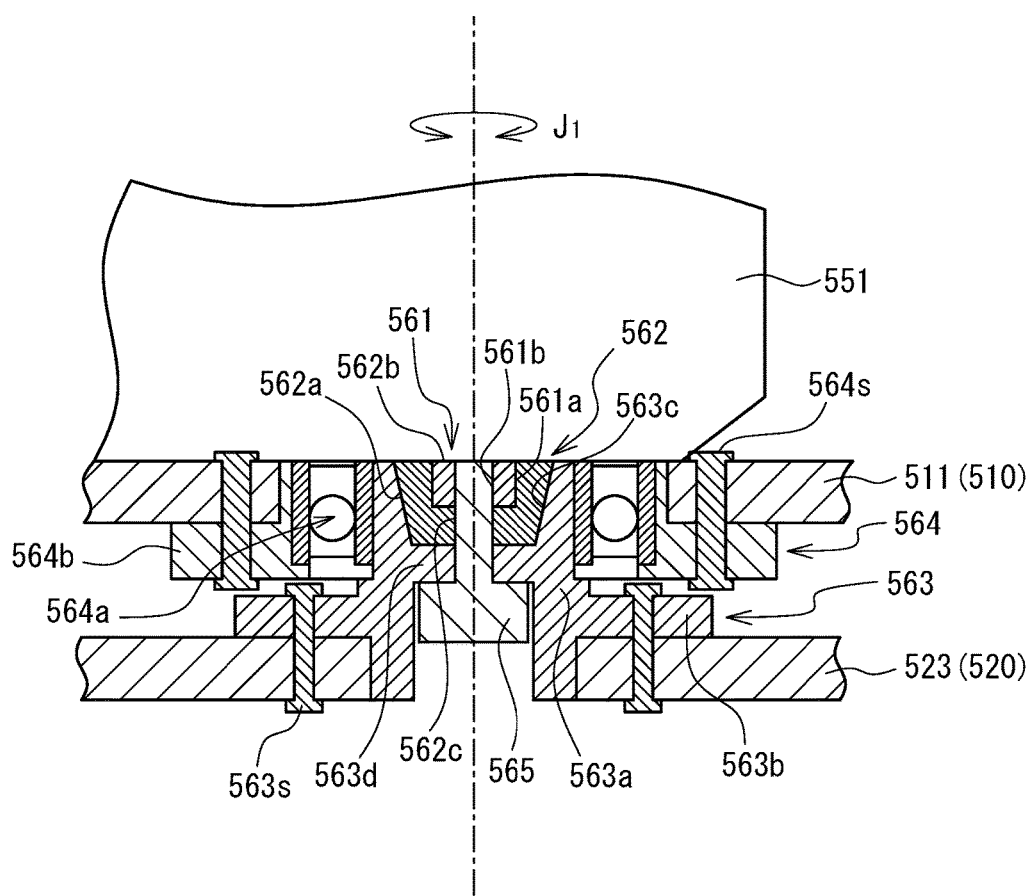
FIG. 3 is a side sectional view of a reinforcement structure of a joint.

FIG. 3 is a side sectional view of a reinforcement structure of the joint J1. All the joints $J_1$ to $J_4$ according to this embodiment are reinforcement joints having the reinforcement structure illustrated in FIG. 3. The reinforcement structures of the joints $J_1$ to $J_4$ will be described below with the joint J1 taken as an example.

The output shaft, 561, of the servo motor 551, which constitutes the joint J1, includes a serration 561a on the outer surface of the output shaft 561. Also, a screw hole 561b is open at the center of the leading end surface of the output shaft 561. The screw hole 561b is cut in a female screw. The output shaft 561 is reinforced by: a tapered block 562, which is a tapered member; a connection member 563; and a bearing member 564, so that the output shaft 561 supports the top plate 523 of the shoulder 520.

The tapered block 562 is a member that has an approximately truncated cone shape and that has a through hole formed along the center of tapered block 562 in its radial direction. The through hole of the tapered block 562 includes: a serrated portion 562b, which has a hole diameter corresponding to the outer dimension of the output shaft 561; and a screw hole 562c, which has a hole diameter corresponding to the outer dimension of the shank of a screw 565. The serrated portion 562b has, on its inner surface, a serration meshed with the serration 561a of the output shaft 561. With the serrated portion 562b meshed with the serration 561a of the output shaft 561, the output shaft 561 and the tapered block 562 rotationally move in the circumferential directions in an integral manner. It is to be noted that the screw hole 562c is not cut in a female screw on its inner surface.

Also, the tapered block 562 has, on its outer surface, a tapered surface 562a (first tapered portion), which gradually decreases in outer diameter dimension from the base end of the output shaft 561 in its axis direction (the same direction as the shoulder rotation axis $J_1$) toward the leading end of the output shaft 561.

The connection member 563 is a member that connects the drive target of the servo motor 551 (in the example of FIG. 3, the top plate 523 of the shoulder 520) to the output shaft 561. The connection member 563 includes: an approximately cylindrical body 563a; and a flange 563b, which is a flat plate extending radially outward from the body 563a in the form of a circular shape. The flange 563b is connected to the top plate 523 of the shoulder 520 with screws 563s. In the cylindrical shape of the body 563a, a held portion 563d is located. The held portion 563d is a flat plate held between the upper surface of the tapered block 562 and the head of the screw 565. At the center of the held portion 563d, a screw hole is located for the shank of the screw 565 to pass through. It is to be noted that the screw hole of the held portion 563d is not cut in a female screw. The screw 565 of the connection member 563 passes through the screw hole of the held portion 563d and the screw hole 562c of the tapered block 562, and is fastened into the screw hole 561b of the output shaft 561. In this manner, the connection member 563 is fixed to the output shaft 561 via the tapered block 562.

A tapered surface 563c (second tapered portion) is located on the inner surface of the cylindrical shape of the body 563a corresponding to the tapered surface 562a of the tapered block 562. The tapered surface 563c has a shape complementary to the shape of the tapered surface 562a of the tapered block 562. It is to be noted that both the tapered surface 562a of the tapered block 562 and the tapered surface 563c of the connection member 563 are flat surfaces, without depressions and protrusions.

The tapered surface 563c of the connection member 563 is fitted with the tapered surface 562a of the tapered block 562 with the connection member 563 fastened to the tapered block 562 with the screw 565. Thus, the tapered surfaces 562a and 563c are pressed against each other, so that the tapered surfaces 562a and 563c are in close contact with each other. With the tapered surfaces 562a and 563c in close contact with each other, there is a frictional force that occurs between the tapered surfaces 562a and 563c and that causes the tapered surfaces 562a and 563c to swing in circumferential directions. This frictional force causes the tapered block 562 and the connection member 563 to rotationally move integrally in circumferential directions.

The tapered block 562 is interposed between the output shaft 561 and the connection member 563. This eliminates the need for removing the screw 565 to pull the connection member 563 out of the output shaft 561 every time the connection angle of the shoulder 520 (second link member) relative to the base 510 (first link member) is adjusted. As described above, the serration 561a is located on the outer surface of the output shaft 561. With this configuration, when the relative angle between the output shaft 561 and a member mounted on the outer surface of the output shaft 561 is changed, it is necessary to pull the member out of the output shaft 561 and then mount the member on the output shaft 561 again. Also in this case, it is necessary to adjust the mounting position of the serration 561a based on the interval between a depression and a protrusion the serration 561a regarded as a minimum unit. In the joint reinforcement structure according to this embodiment, the tapered block 562 is mounted on the outer surface of the output shaft 561, and the connection member 563 and the tapered block 562 are caused to rotationally move integrally by the frictional force of the close contact of the tapered surfaces 562a and 563c. This ensures that the relative angle between the base 510 and the shoulder 520 is adjusted only by slightly loosening the screw 565 to release the close contact of the tapered surfaces 562a and 563c, leaving the base 510 and the shoulder 520 connected to each other with the screw 565. Also, both the tapered surfaces 562a and 563c are flat surfaces, without depressions or protrusions. This ensures that any desired relative angle can be set between the tapered surfaces 562a and 563c without being influenced by the interval between the depression and protrusion of the serration 561a.

The connection member 563 is supported by the bearing member 564 at the servo motor 551 side outer surface of the connection member 563. The bearing member 564 includes: a ring-shaped bearing portion 564a, which rotatably supports the connection member 563; and a flange 564b, which is a flat plate extending radially outward from the bearing portion 564a in the form of a circular shape. The flange 564b is fixed to the bottom plate 511 of the base 510 with screws 564s.

Each of the joints $J_1$ to $J_4$ has the reinforcement structure illustrated in FIG. 3. This ensures that the stress radially acting on the output shafts of the servo motors 551 to 554 is dispersed to surrounding portions. This enables the joints $J_1$ to $J_4$ to stably support the weight of the arm unit 500, the weight of the hand 600, and even the load of the object lifted by the hand 600. It is to be noted that while in this embodiment all the joints $J_1$ to $J_4$ are reinforcement joints each having the reinforcement structure illustrated in FIG. 3, it is also possible that reinforcement joints are implemented only by some of the joints $J_1$ to $J_4$, when a particular load is expected.

(Modification of Arm Unit)

The number of joints of the arm unit according to the present invention will not be limited to the configuration of the arm unit 500; it is possible to change, as necessary, the number of joints considering how complicated the work is, accuracy required, cost tolerated, and/or other considerations. Description will be made below with regard to a modification of the arm unit 500 in which the arm unit 500 has an enlarged joint structure.

Figure 4:
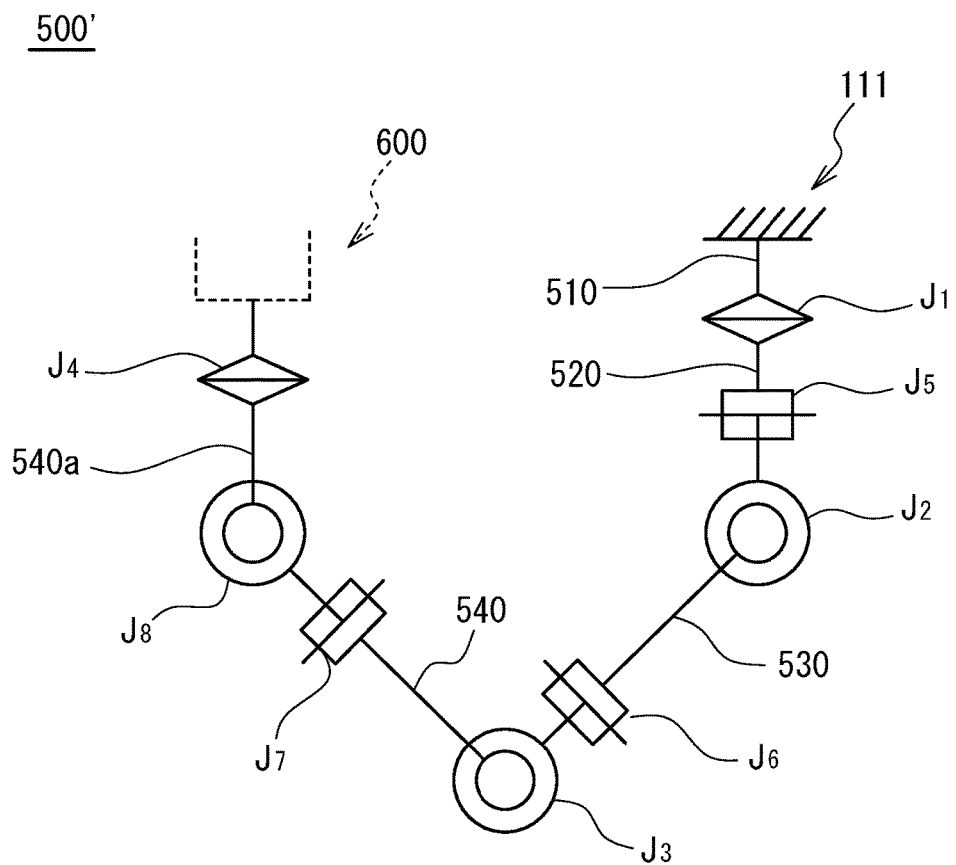
FIG. 4 is a schematic illustrating a joint structure of a modification of the arm unit.

FIG. 4 is a schematic illustrating a joint structure of an arm unit 500', which is a modification of the arm unit 500. The arm unit 500' includes, in addition to the joints $J_1$ to $J_4$ of the arm unit 500: an upper-arm swinging axis $J_5$; a lower-arm swinging axis $J_6$; a wrist swinging axis $J_7$; and a wrist swinging axis $J_8$ (these will be hereinafter collectively referred to as "joints $J_1$ to $J_8$"). The upper-arm swinging axis $J_2$ and the upper-arm swinging axis $J_5$ are joints that cause the upper arm 530 to swing in directions orthogonal to each other. The lower-arm swinging axis $J_3$ and the lower-arm swinging axis $J_6$ are joints that cause the lower arm 540 to swing in directions orthogonal to each other. The wrist swinging axis $J_7$ and the wrist swinging axis $J_8$ are joints that cause the wrist 540a to swing in directions orthogonal to each other. Thus, the arm unit 500' includes the joints $J_1$ to $J_8$. This enables the arm unit 500' to absorb an unexpected movement and/or an unexpected inclination of the multi-copter 100 using these joints $J_1$ to $J_8$, ensuring that the posture of the wrist 540a, that is, the posture of the hand 600 is kept constant.

FIGS. 5A to 5F is a schematic illustrating a method of maintaining the posture of the wrist 540a of the arm unit 500'. FIGS. 5A, 5C, and 5D are side views of the arm unit 500', and FIGS. 5B, 5E, and 5F are front views of the arm unit 500'. For convenience of description, FIGS. 5A to 5F only illustrates the adapter plate 111 and one of the two arm units 500', among the configuration of the multi-copter 100, with other elements of the configuration omitted.

Among the illustrations in FIGS. 5A to 5F, FIGS. 5A to 5FA is an example in which the upper-arm swinging axis $J_2$, the lower-arm swinging axis $J_3$, and the wrist swinging axis $J_8$ absorb a movement of the multi-copter 100 in the front or rear direction. FIGS. 5A to 5FB is an example in which the upper-arm swinging axis $J_5$, the lower-arm swinging axis $J_6$, and the wrist swinging axis $J_7$ absorb a movement of the multi-copter 100 in the right or left direction. FIGS. 5A to 5FC is an example in which the upper-arm swinging axis $J_2$, the lower-arm swinging axis $J_3$, and the wrist swinging axis $J_8$ absorb a movement of the multi-copter 100 in a vertical direction. FIGS. 5A to 5FD is an example in which the upper-arm swinging axis $J_2$ absorbs a swaying motion of the multi-copter 100 in the front or rear direction. FIGS. 5A to 5FE is an example in which the upper-arm swinging axis $J_5$ absorbs a swaying motion of the multi-copter 100 in the right or left direction. FIGS. 5A to 5FF is an example in which the shoulder rotation axis $J_1$ absorbs a rotation of the multi-copter 100. By combining these examples suitably, the multi-copter 100 is able to make various movements.

Thus, the multi-copter 100 includes the arm unit 500' to automatically maintain the posture of the wrist 540a. This stabilizes the position of the hand 600 in the air, enabling the operator to focus on handling of the hand 600. This increases the quality of the work using the multi-copter 100. It is to be noted that as seen from FIGS. 5A to 5F, the wrist rotation axis $J_4$ is not used to maintain the posture of the wrist 540a. The wrist rotation axis $J_4$ is a configuration unique to the arm unit 500 and can be omitted when another end effector is used.

(Hand Structure)

Figure 6A:
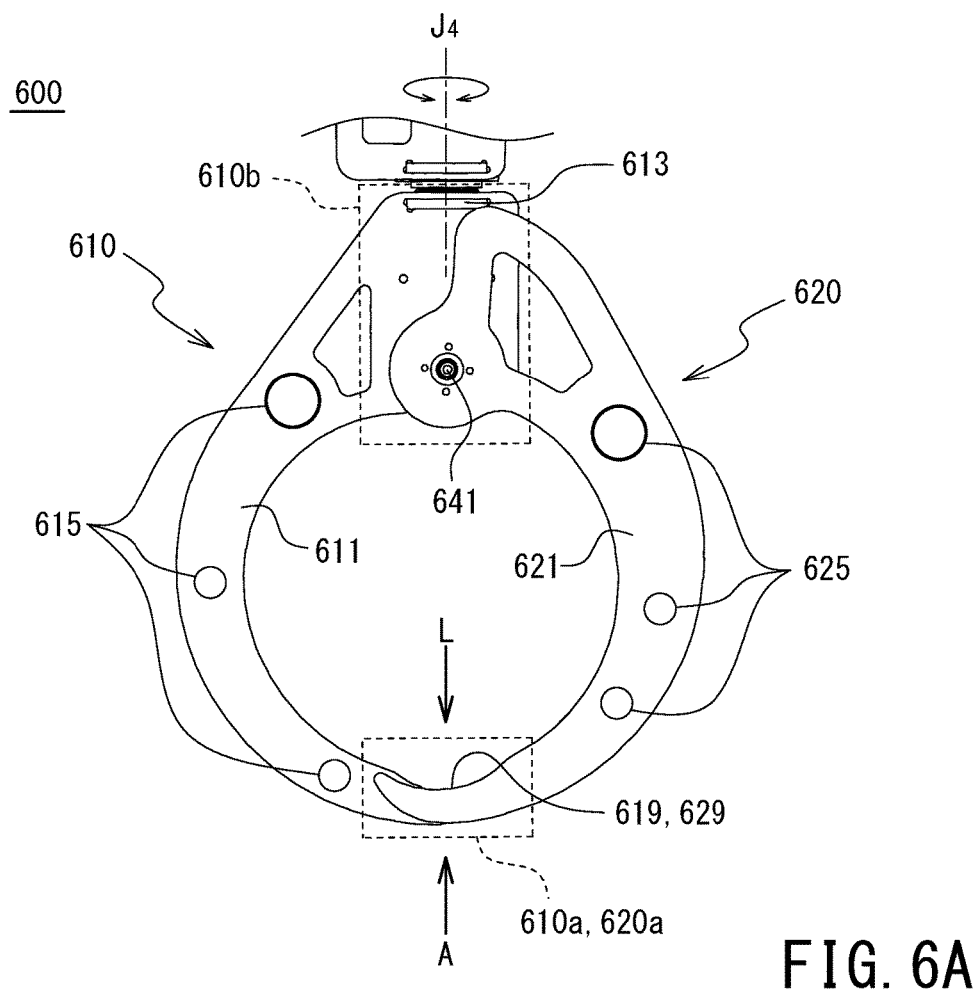
FIGS. 6A and 6B illustrate a side view and a front view of a structure of a hand.
Figure 6B:
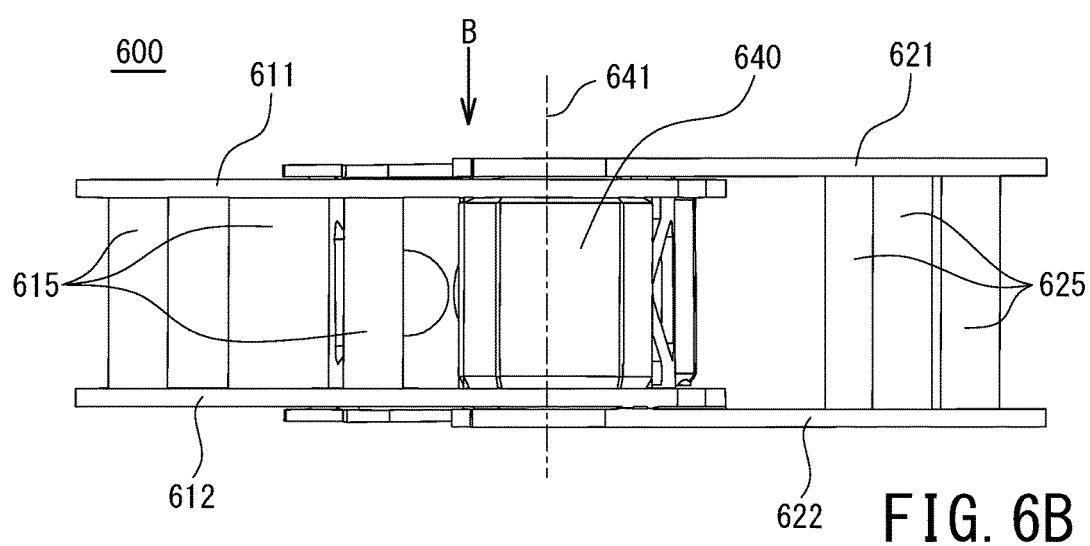

FIGS. 6A and 6B illustrate a side view and a front view of a structure of the hand 600. FIG. 6A is a side view of the hand 600 closed in ring form and is a view of the hand 600 from the direction indicated by arrow B in FIG. 6B. FIG. 6B is a front view of the hand 600 from the direction indicated by arrow A in FIG. 6A. As illustrated in FIG. 6, the hand 600 according to this embodiment is a gripper mechanism having a fork claw shape. There is no particular limitation to the application in which the hand 600 is used. It is to be noted that the hand 600 according to this embodiment is made of a CFRP plate, similarly to the link members 510 to 540.

The hand 600 includes a fixed claw 610 and a movable claw 620, which form a pair of claws and have approximately arc shapes. The fixed claw 610 includes two side plates 611 and 612, which are arranged in parallel with each other. Between the side plate 611 and the side plate 612, three pipe materials 615 are arranged perpendicularly to the plate surfaces of the side plates 611 and 612. The side plate 611 and the side plate 612 are connected to each other through the pipe materials 615. Similarly, the movable claw 620 includes two side plates 621 and 622, which are arranged in parallel with each other. Between the sideplate 621 and the sideplate 622, three pipe materials 625 are arranged perpendicularly to the plate surfaces of the side plates 621 and 622. The side plate 621 and the side plate 622 are connected to each other through the pipe materials 625. Thus, the side plates 611 and 612 are connected to each other through the hollow pipe materials 615, and the side plates 621 and 622 are connected to each other through the hollow pipe materials 625. This represents an attempt to make the hand 600 lighter in weight, which is realized by removing its internal structure, and to maintain the rigidity of the hand 600 at the same time.

Also, at the base end, 610b, of the fixed claw 610, a bottom plate 613 is mounted. The bottom plate 613 is connected to the wrist 540a through the wrist rotation axis $J_4$. Further at the base end 610b of the fixed claw 610, a servo motor 640 is located. The servo motor 640 is a driving source of the movable claw 620. A shaft structure 641 of the servo motor 640 is connected to the movable claw 620 through the side plates 611 and 612 of the fixed claw 610. With the fixed claw 610 according to this embodiment being basically in fixed state, the movable claw 620 rotationally moves about the shaft structure 641 of the servo motor 640, thereby opening and closing the leading ends, 610a and 620a, of the hand 600.

Figure 7A:
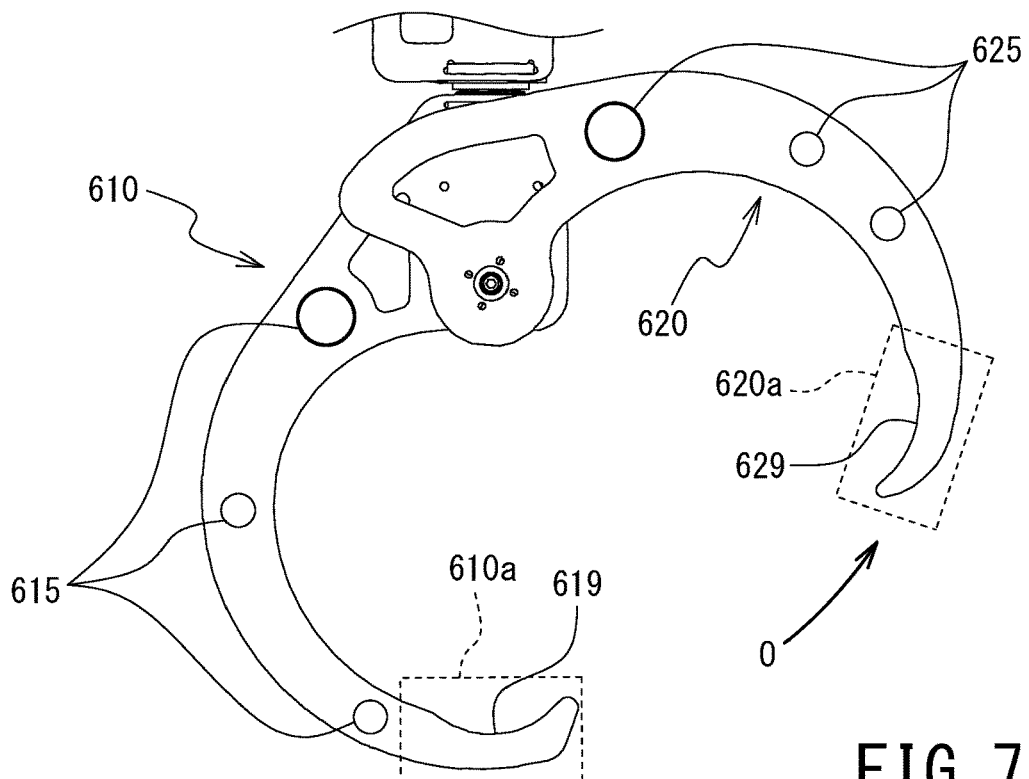
FIGS. 7A and 7B illustrate side views of the hand illustrating its opening and closing motions.
Figure 7B:
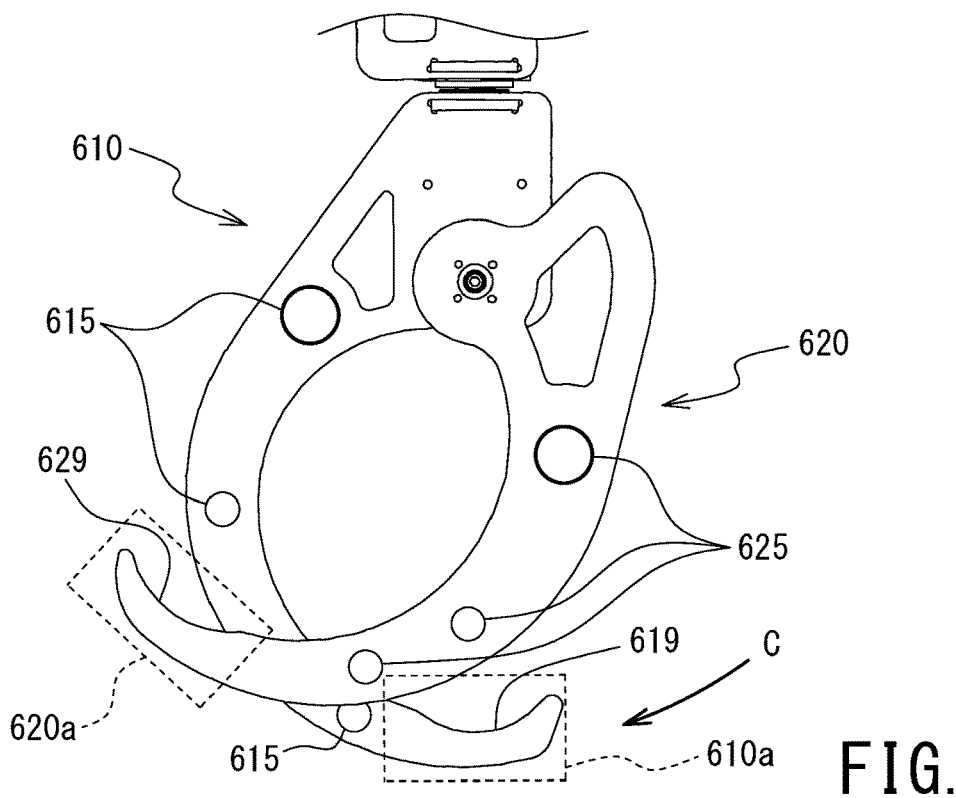

FIGS. 7A and 7B illustrate side views of the hand 600 illustrating its opening and closing motions. FIG. 7A illustrates a state in which the movable claw 620 has rotationally moved in opening direction O. FIG. 7B illustrates a state in which the movable claw 620 has rotationally moved farthest in closing direction C. As described earlier, the opening and closing motions of the hand 600 are implemented by the movable claw 620 when the movable claw 620 rotationally moves about the shaft structure 641 of the servo motor 640. As illustrated in FIG. 6B, the side plates 611 and 612 of the fixed claw 610 and the side plates 621 and 622 of the movable claw 620 are located at different positions in the thickness direction. Specifically, the side plates 621 and 622 of the movable claw 620 are located at positions where the inner plate surfaces of the side plates 621 and 622 respectively contact the outer plate surfaces of the side plates 611 and 612 of the fixed claw 610. That is, the leading ends 610a and 620a of the movable claw 620 and the fixed claw 610 are located at positions where the leading ends 610a and 620a do not collide with each other while the movable claw 620 is rotationally moving. This enables the movable claw 620 to be closed deeply to the position (FIG. 7B) where a pipe material 625 of the movable claw 620 contacts the fixed claw 610.

(Hand Lock Structure)

As illustrated in FIG. 6A, depressions 619 and 629 are formed respectively at the leading ends 610a and 620a of the fixed claw 610 and the movable claw 620 according to this embodiment. The depressions 619 and 629 are shaped such that when the hand 600 is closed into ring form, inner portions of the leading ends 610a and 620a are partially depressed outward. The depressions 619 and 629 are formed at the same positions in a circumferential direction of the hand 600 closed in ring form.

For example, when a heavy object is suspended and supported on a wire or a handle, a load is applied to the depressions 619 and 629 in the direction indicated by arrow L in FIG. 6A. This makes the leading ends 610a and 620a of the fixed claw 610 and the movable claw 620 locked into an unseparatable state. This prevents the hand 600 from being unintentionally opened while the hand 600 is carrying the heavy object.

(Flight Functions of Multi-Copter)

Figure 8:
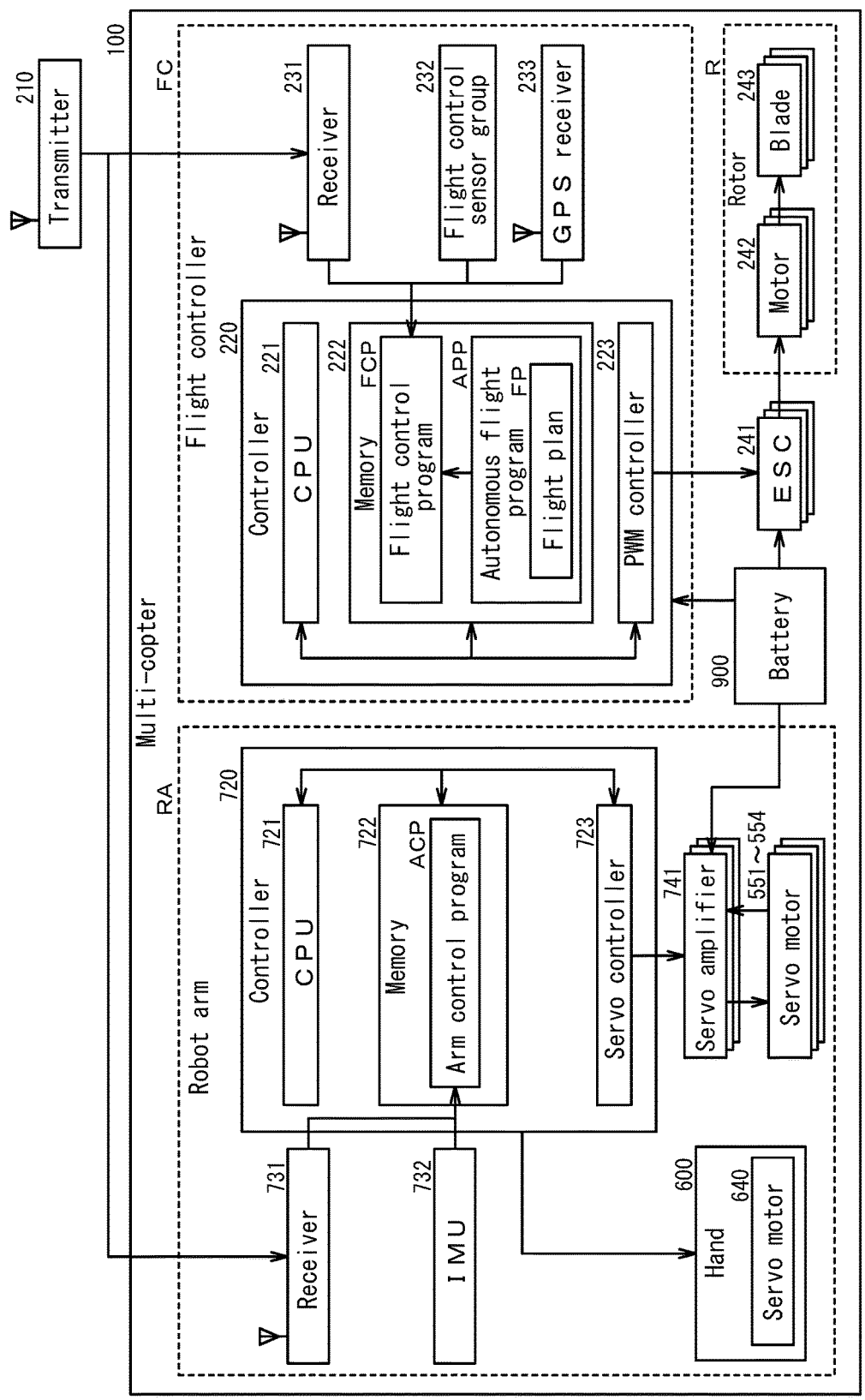
FIG. 8 is a block diagram illustrating a functional configuration of a multi-copter according to the first embodiment.

FIG. 8 is a block diagram illustrating a functional configuration of the multi-copter 100. The functions of the multi-copter 100 mainly includes: a flight controller FC; a plurality of rotors R; an ESC 241 (Electric Speed Controller), which is provided on an individual rotor R basis; the robot arm RA according to this embodiment; and a battery 900, which supplies power to the foregoing elements. Basic flight functions of the multi-copter 100 will be described below.

Each of the rotors R includes a motor 242 and a blade 243, which is connected to the output shaft of the rotor R. The ESC 241 is connected to the motor 242 of the rotor R and causes the motor 242 to rotate at a speed specified by the flight controller FC.

The flight controller FC includes: a receiver 231, which receives a manipulation signal from the operator (transmitter 210); and a controller 220, which is a micro-controller to which the receiver 231 is connected. The controller 220 includes: a CPU 221, which is a central processing unit; a memory 222, which is a storage device such as ROM and RAM; and a PWM (Pulse Width Modulation) controller 223, which controls the number of rotations of each motor 242 through the ESC 241.

The flight controller FC further includes a flight control sensor group 232 and a GPS receiver 233 (these will be hereinafter occasionally referred to as "sensors"). The flight control sensor group 232 and the GPS receiver 233 are connected to the controller 220. The flight control sensor group 232 of the multi-copter 100 according to this embodiment includes a three-axis acceleration sensor, a three-axis angular velocity sensor, a pneumatic sensor (altitude sensor), and a geomagnetic sensor (direction sensor). The controller 220 is capable of obtaining, from these sensors, how much the airframe is inclined or rotating, latitude and longitude of the airframe on flight, altitude, and position information of the airframe including nose azimuth.

The memory 222 of the controller 220 stores a flight control program FCP, in which an algorithm for controlling the posture of the multi-copter 100 during flight and controlling basic flight operations is described. In response to an instruction from the operator, the flight control program FCP adjusts the number of rotations of each rotor R based on information obtained from the sensors so as to correct the posture and/or position of the airframe while the multi-copter 100 is making a flight.

The multi-copter 100 may be manipulated manually by the operator using the transmitter 210. Another possible example is to register, in an autonomous flight program APP, a flight plan FP that includes parameters such as the flight path, speed, and altitude of the multi-copter 100, and to cause the multi-copter 100 to fly autonomously to the destination (this kind of autonomous flight will be hereinafter referred to as "autopilot").

Thus, the multi-copter 100 according to this embodiment has high-level flight control functions. It is noted, however, that the unmanned aerial vehicle according to the present invention will not be limited to the form of the multi-copter 100; insofar as the unmanned aerial vehicle includes the robot arms RA, the unmanned aerial vehicle may be an airframe with some of the sensors omitted or may be an airframe that has no autopilot function and is capable of flying only by manual manipulation.

(Functional Configuration of Robot Arm)

As illustrated in FIG. 8, the robot arm RA according to this embodiment mainly includes: a receiver 731, which receives a manipulation signal from the operator (transmitter 210); a controller 720, which is a micro-controller to which the receiver 731 is connected; the servo motors 551 to 554, which respectively drive the joints $J_1$ to $J_4$ of the arm unit 500; a servo amplifier 741, which is provided for each of the servo motors 551 to 554; and an IMU (Inertial Measurement Unit) 732, which is a displacement detector that detects a change of the position of the arm unit 500 and an inclination of the arm unit 500. The servo amplifier 741, while receiving feedback from the servo motors 551 to 554, adjusts the output shafts of the servomotors 551 to 554 at specified angle positions. The IMU 732 is a typical inertia measurement device, and mainly includes an acceleration sensor and an angular velocity sensor.

The controller 720 includes: a CPU 721, which is a central processing unit; a memory 722, which is a storage device such as ROM and RAM; and a servo controller 723, which specifies the rotational angles of the servo motors 551 to 554 to the servo amplifier 741. In the memory 722, an arm control program ACP is registered. The arm control program ACP is arm controlling means for controlling the driving of the servo motors 551 to 554. At an instruction from the operator, the arm control program ACP changes the posture of the arm unit 500, and opens and closes the hand 600.

Further, when an IMU 731 has detected a position error that is an unexpected change of the position of the arm unit or an unexpected inclination of the arm unit 500, the arm control program ACP causes the joints $J_1$ to $J_4$ to automatically absorb the position error so as to minimize transmission of the position error to the wrist 540a. The arm unit 500 according to this embodiment has a small number of joints, and the kinds of position errors absorbable and the level of absorption are limited. Still, employing the arm unit 500', which is a modification of the arm unit 500, ensures that the wide variety of position errors illustrated in FIGS. 5A to 5F are absorbed. It is to be noted that since the position error dealt with by the arm control program ACP is an "unexpected" change of position of the arm unit 500 or an "unexpected" inclination of the arm unit 500, those changes of the posture of the arm unit 500 and movements of the airframe caused by the operator's manipulation can be disregarded.

It is to be noted that the IMU 732 according to this embodiment is contained in the airframe center portion 110. This ensures that a change of the position of the airframe of the multi-copter 100 or an inclination of the airframe is accurately detected. The arm control program ACP according to this embodiment indirectly calculates the position error of the arm unit 500 based on the displacement of the airframe. Additionally, by providing the IMU 732 in, for example, the wrist 540a, the state of the wrist 540a and/or the hand 600 can be directly recognized. This stabilizes the position and/or posture of the hand 600 in the air with improved accuracy.

(Swaying Motion Control Function)

Figure 9A:
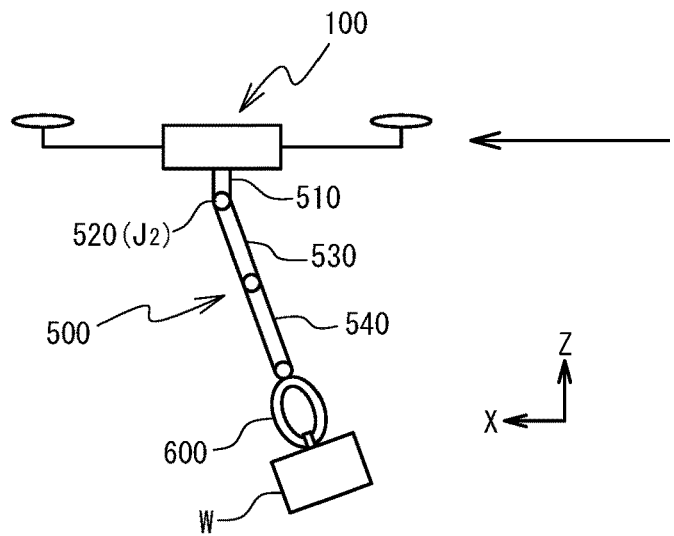
FIGS. 9A and 9B are schematics illustrating a swaying motion control function of a robot arm.
Figure 9B:
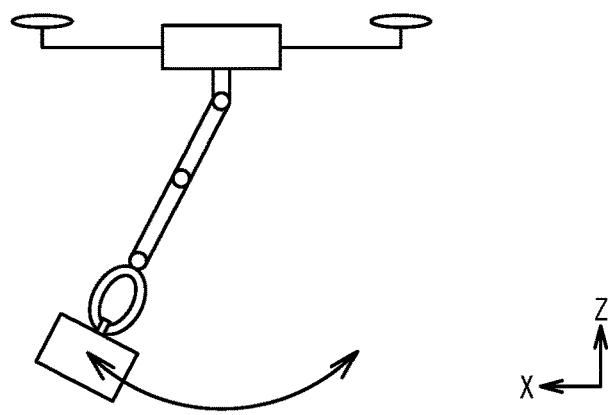

FIGS. 9A and 9B are schematics illustrating a swaying motion control function of the robot arm RA. For convenience of description, only one of the two arm units 500 is illustrated in FIG. 9. The arm control program ACP according to this embodiment uses the upper-arm swinging axis $J_2$ as the swaying motion control joint according to the present invention when, for example, the multi-copter 100 carries a piece of freight W. More specifically, when the multi-copter 100 makes a horizontal flight while suspending and supporting the piece of freight W, the arm control program ACP adjusts the orientation of the shoulder 520 to enable the upper-arm swinging axis $J_2$ to swing in the direction of progress of the multi-copter 100. Then, the arm control program ACP orients the upper arm 530 and the lower arm 540, which constitute a suspending support portion according to the present invention, downward in a linear manner (FIG. 9A). Then, upon stopping of the horizontal flight of the multi-copter 100, the arm control program ACP gradually increases the holding property of the servo motor 552, which constitutes the upper-arm swinging axis $J_2$, so as to quickly alleviate the swaying motion of the suspending support portion and the piece of freight W (FIG. 9B).

(Modifications of Robot Arm Function)

Figure 10:
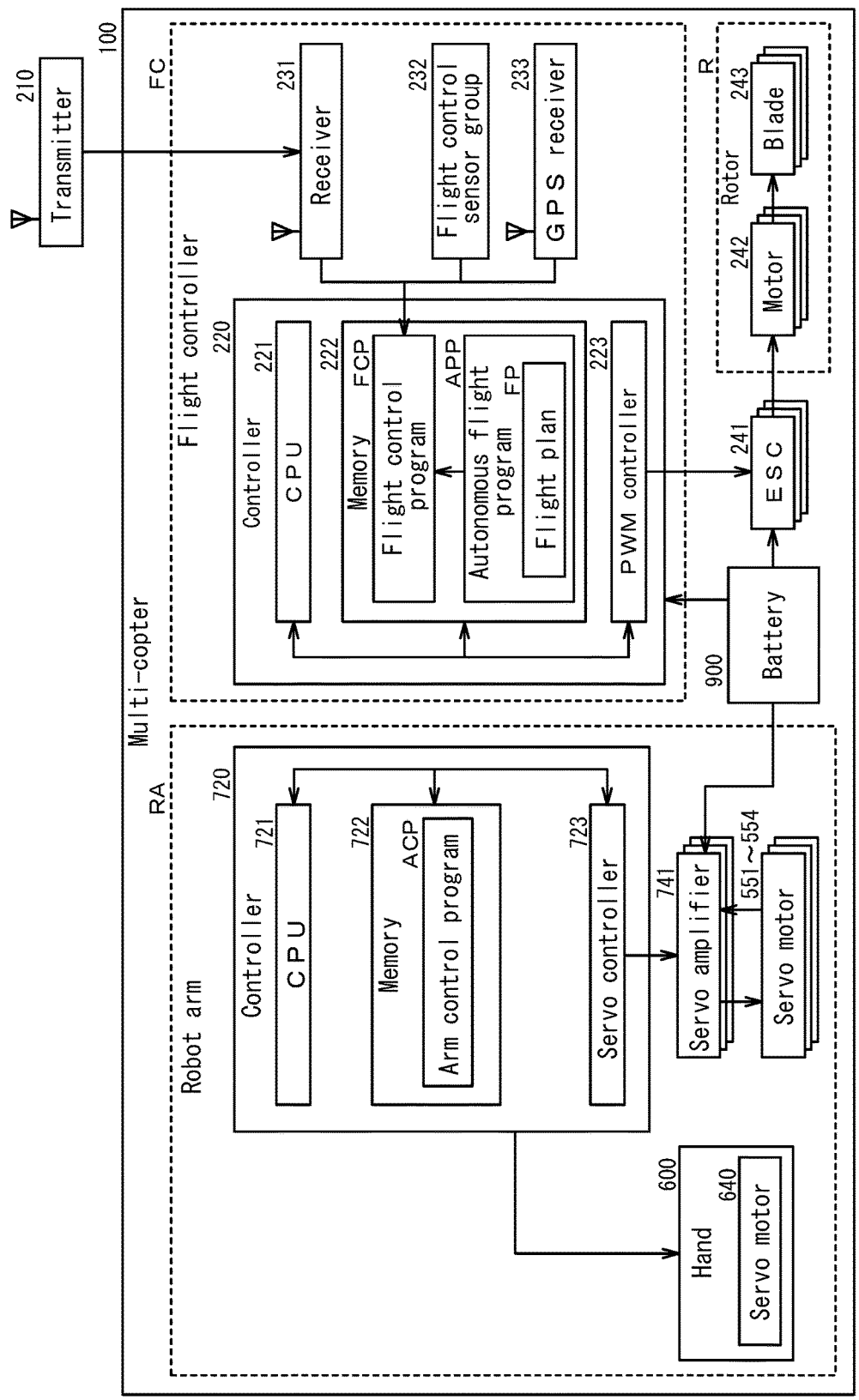
FIG. 10 is a block diagram illustrating a functional configuration of a modification of the robot arm.

FIG. 10 is a block diagram illustrating a functional configuration of a modification of the robot arm RA. While the robot arm RA according to this embodiment uniquely includes the receiver 731 and the IMU 732, another possible example is that, instead of the receiver 731 and the IMU 732, the receiver 231 of the flight controller FC, the three-axis acceleration sensor of the flight control sensor group 232, and/or the three-axis angular velocity sensor of the flight control sensor group 232 are also used for the robot arm RA.

Figure 11:
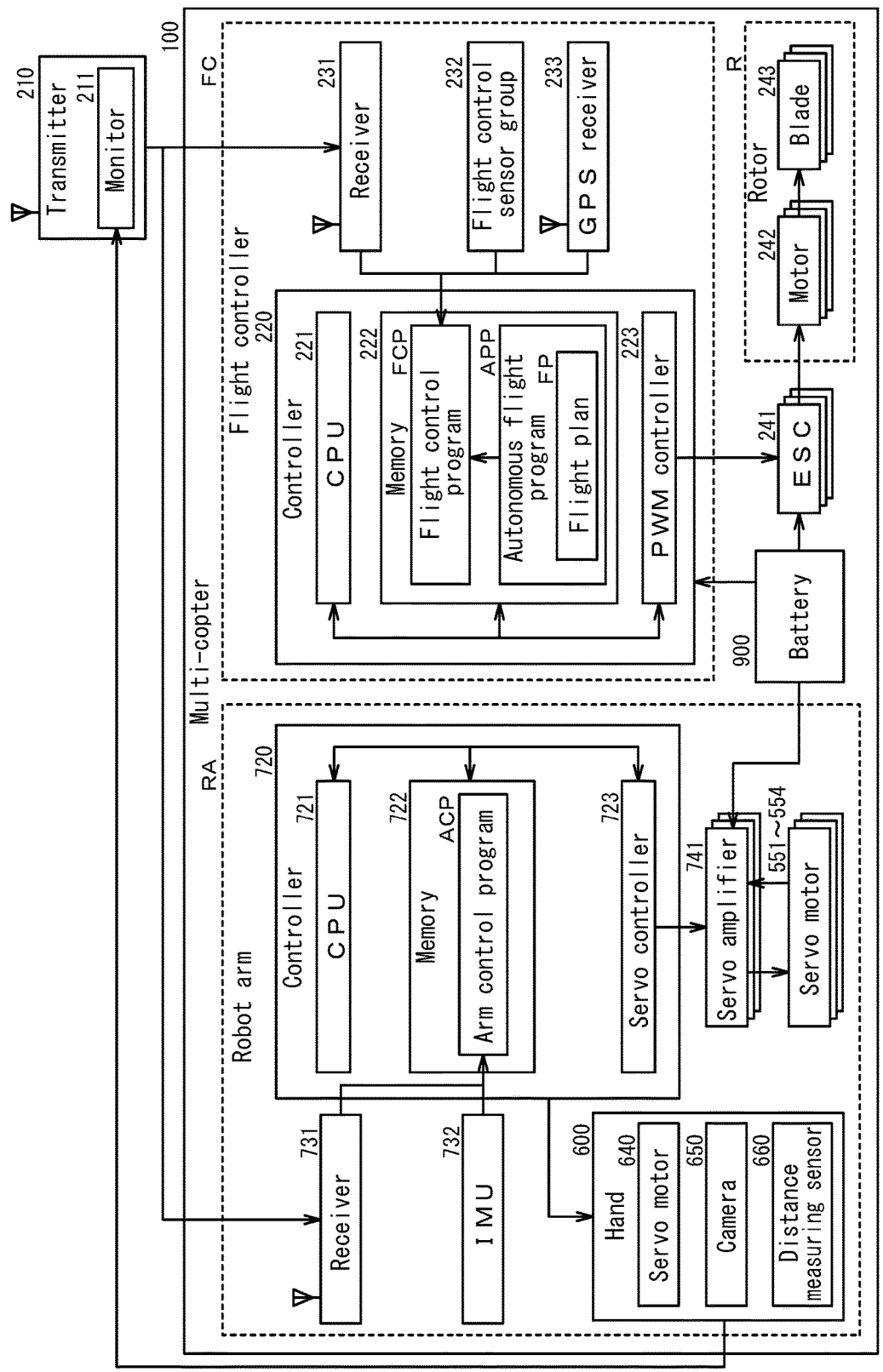
FIG. 11 is a block diagram illustrating a functional configuration of another modification of the robot arm.

FIG. 11 is a block diagram illustrating a functional configuration of another modification of the robot arm RA. The hand 600 according to this modification includes: a camera 650, which is image picking-up means for picking up an image of a state of a workpiece, which is a work target of the hand 600; and a distance measuring sensor 660, which is distance measuring means for measuring the distance between the hand 600 and the workpiece. It is to be noted that the distance measuring sensor 660 is a typical distance sensor that uses non-contact distance measuring means such as ultrasonic, laser, and infrared light.

In this modification, an image picked up by the camera 650 can be displayed on a monitor 211, which can be located at a hand of the operator (transmitter-receiver 210), enabling the operator to work on the workpiece while visually checking the state of the workpiece. Also, even when it is difficult to recognize the actual distance between the hand 600 and the workpiece from the image picked up by the camera 650, the distance between the hand 600 and the workpiece can be recognized in the form of values using the distance measuring sensor 660. This further increases the quality of the work performed by the multi-copter 100. It is to be noted that only one of the camera 650 and the distance measuring sensor 660 may be mounted on the hand 600.

Second Embodiment

Figure 12:
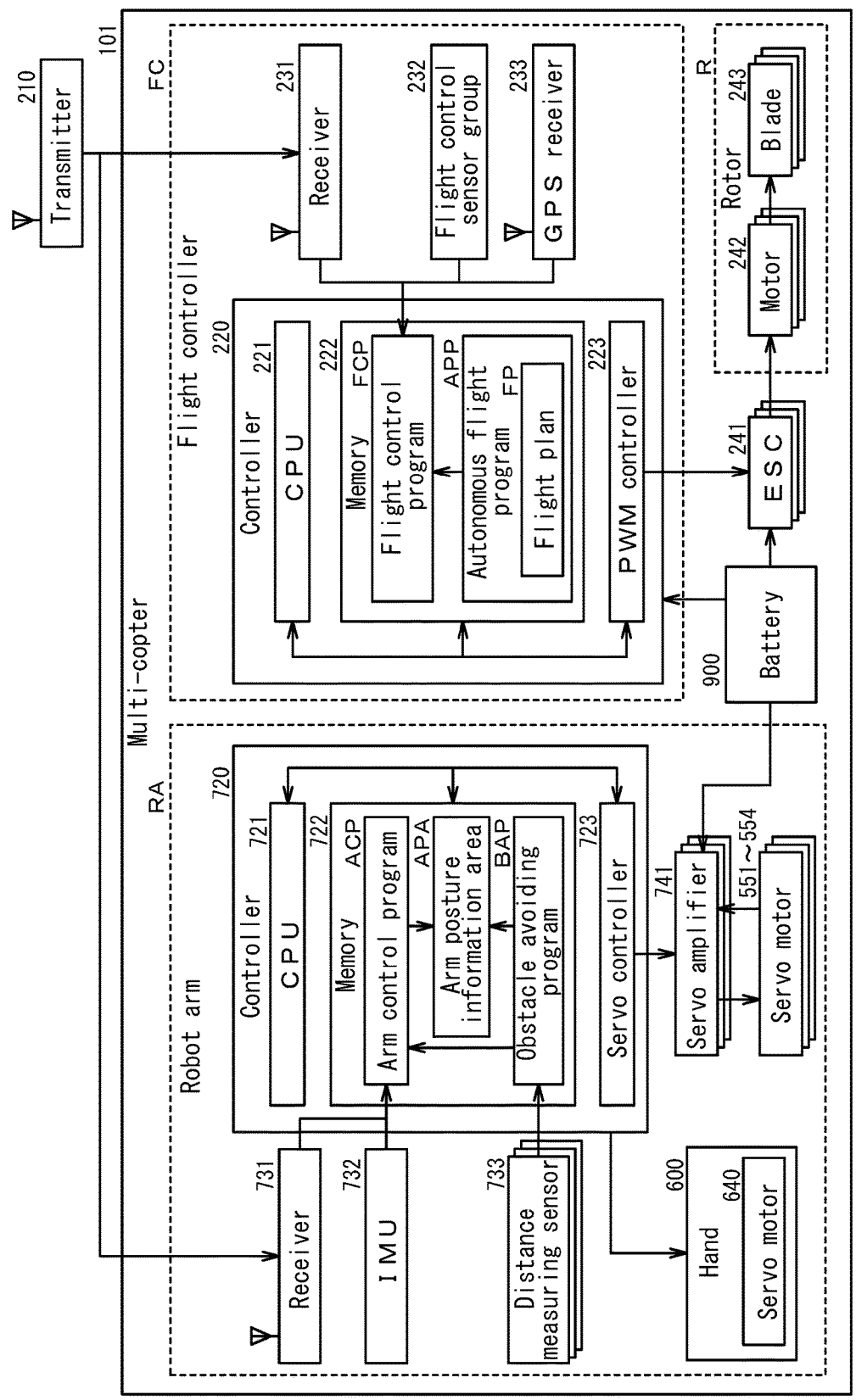
FIG. 12 is a block diagram illustrating a functional configuration of a multi-copter according to a second embodiment.

A second embodiment of the unmanned aerial vehicle according to the present invention will be described below by referring to the accompanying drawings. FIG. 12 is a block diagram illustrating a functional configuration of a multi-copter 101 according to the second embodiment. In the following description, configurations serving identical or similar functions in this and previous embodiment will be denoted the same reference numeral and will not be elaborated further upon here.

(Obstacle Avoiding Function)

As illustrated in FIG. 12, the robot arm RA of the multi-copter 101 includes, in addition to the configuration of the robot arm RA of the multi-copter 100: a plurality of distance measuring sensors 733, which are distance measuring means; an obstacle avoiding program BAP, which is obstacle avoiding means for monitoring values measured by the distance measuring sensors 733; and an arm posture information area APA, to which the arm control program ACP and the obstacle avoiding program BAP have access.

The plurality of distance measuring sensors 733 continually measure the distance between the airframe center portion 110 and an object around the arm unit 500. Each of the distance measuring sensors 733 is a typical distance sensor that uses non-contact distance measuring means such as ultrasonic, laser, and infrared light. The obstacle avoiding program BAP adjusts the posture of the arm unit 500 to avoid the obstacle detected by the distance measuring sensors 733. It is to be noted that the obstacle avoiding program BAP according to this embodiment does not directly control the arm unit 500 but controls the arm unit 500 by sending an instruction to the arm control program ACP. The arm posture information area APA is storing means that stores information with which the current posture of the arm unit 500 is identifiable. The information stored in the arm posture information area APA is continually updated with latest information by the arm control program ACP.

Figure 13A:
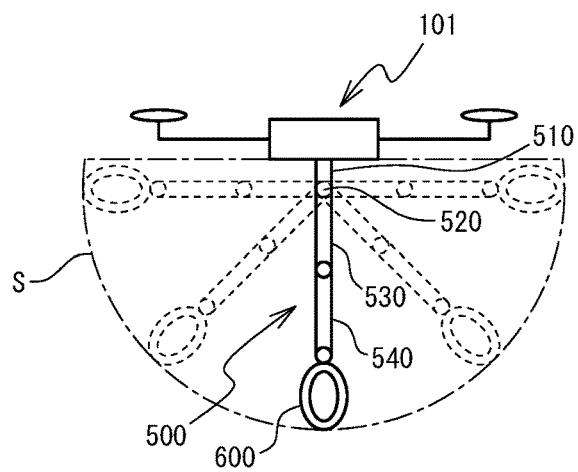
FIGS. 13A to 13C are schematics illustrating an obstacle avoiding motion of the arm unit.
Figure 13B:
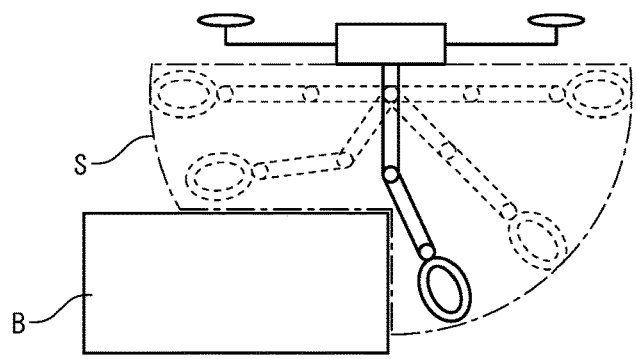
Figure 13C:
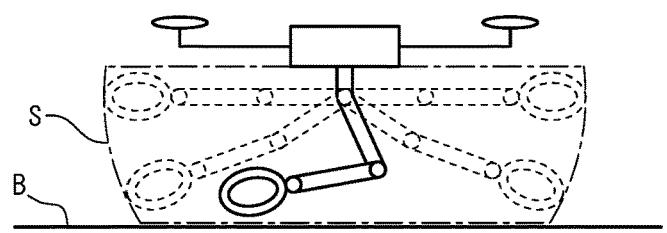

FIGS. 13A to 13C are schematics illustrating an obstacle avoiding motion of the arm unit 500. As indicated by a single-dashed line in FIGS. 13A to 13C, range S is a movable range of the arm unit 500 and the hand 600 (these will be hereinafter referred to as "arm unit 500 and related element"). For convenience of description, only one pair of the arm unit 500 and the related element among the two pairs of the arm unit 500 and the related element are illustrated in FIGS. 13A to 13C. The obstacle avoiding program BAP monitors the values measured by the distance measuring sensors 733 (FIG. 13A), and upon detection of an obstacle B in the movable range S of the arm unit 500 and the related element, adjusts the posture of the arm unit 500 to prevent the arm unit 500 and the related element from contacting the obstacle B (FIGS. 13B and 13C). It is to be noted that the obstacle B illustrated in FIG. 13C is a ground.

Thus, the multi-copter 101 includes the distance measuring sensors 733 and the obstacle avoiding program BAP. This eliminates or minimizes collision accidents of the arm unit 500 and the related element with the obstacle B without relying on the operator's pilotage. It is to be noted that while in this embodiment the plurality of distance measuring sensors 733 are arranged to cover approximately the entire movable range S of the arm unit 500 and the related element, the number of the distance measuring sensors 733 and their measured range will not be limited to the form of the multi-copter 101. For example, the multi-copter 101 may include only one distance measuring sensor 733 pointed vertically downward from the airframe center portion 110 so that only a contact of the arm unit 500 and the related element with the ground is avoided. Alternatively, it is possible to arrange a distance measuring sensor 733 that measures only a range extending from a space vertically under the airframe center portion 110 toward the nose of the airframe (in the direction of progress). Further, such a configuration is possible that measures a predetermined angle range by rotating one or a plurality of distance measuring sensors 733.

(Obstacle Mis-Detection Preventing Function)

Figure 14A:
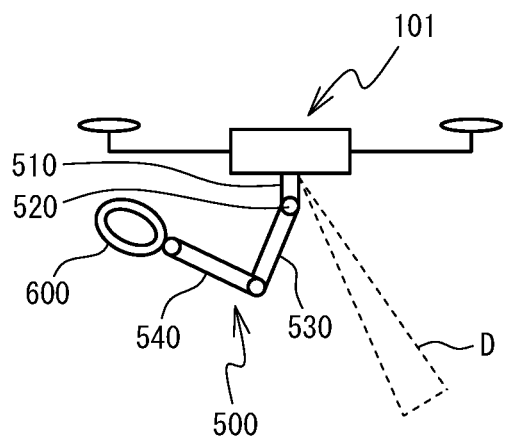
FIGS. 14A and 14B illustrate schematics illustrating an obstacle mis-detection preventing function of the multi-copter.
Figure 14B:
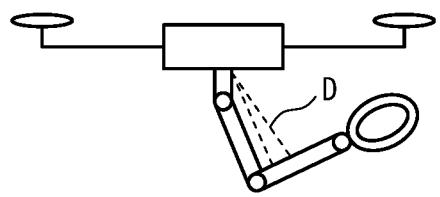

FIGS. 14A and 14B are schematics illustrating an obstacle mis-detection preventing function of the multi-copter 101. As indicated by single-dashed lines in FIGS. 14A and 14B, range D is a measured range of one distance measuring sensor 733 among the plurality of distance measuring sensors 733. For convenience of description, only one pair of the arm unit 500 and the related element among the two pairs of the arm unit 500 and the related element are illustrated in FIGS. 14A to 14C.

The distance measuring sensors 733 according to this embodiment measure, from the airframe center portion 110 of the multi-copter 101, a range including the movable range S of the arm unit 500 and the related element (FIG. 14A). This may cause part of the arm unit 500 and the related element to be included within the measured range, when the arm unit 500 and the related element take a particular posture (FIG. 14B). If the obstacle avoiding program BAP has erroneously determines the arm unit 500 and the related element as the obstacle B, the arm unit 500 and the related element may withdraw in a direction in which the arm unit 500 and the related element avoid themselves. This may make the arm unit 500 and the related element uncontrollable.

In light of the above circumstances, the obstacle avoiding program BAP of the multi-copter 101 is set to: continually recognize the current position of the arm unit 500 based on the information stored in the arm posture information area APA; and disregard an object detected at the position. It is to be noted that the obstacle mis-detection preventing function will not be limited to the form of the multi-copter 101; for example, such a configuration is possible that does not include the arm posture information area APA and that determines an object as the obstacle B when the object is gradually approaching the multi-copter 101 from a distance within the measured range of the distance measuring sensors 733 while determining an object as the arm unit 500 and the related element when the object has suddenly appeared in the measured range of the distance measuring sensors 733.

Embodiments and modifications of the present invention have been described hereinbefore. The present invention, however, will not be limited to the above-described embodiments and modifications but may have various other modifications without departing from the scope of the present invention. For example, the number of the arm units 500 and the arm units 500' constituting the robot arm RA will not be limited to two but may be one, three, or more than three. Also, while the above-described embodiments are mainly regarding a configuration that stabilizes the position of the wrist 540a and/or the hand 600 in the air, a similar method may be used to implement the arm control program ACP to stabilize the position of the lower arm 540 or another portion that is other than the leading end of the arm unit 500. In this case, the kinds of position errors absorbable and the level of absorption are limited. Also, the aerial vehicle according to the present invention will not be limited to an unmanned rotary-wing vehicle but may be: an unmanned fixed-wing vehicle equipped with the robot arm RA; or even a manned aerial vehicle.

The invention claimed is:

1. A robot arm mountable on an unmanned aerial vehicle comprising a plurality of rotary wings, the robot arm comprising:
    an arm unit comprising a plurality of joints;
    arm controlling means for controlling driving of the joints; and
    a displacement detector capable of detecting a change of a position of the arm unit and an inclination of the arm unit,
    wherein two of the plurality of joints swingable in directions orthogonal to each other are regarded as a pair of the joints, and the plurality of joints comprise
        three pairs of the joints, and
        one joint, among the joints, that is located further at a side of a base end of the arm unit than the three pairs of the joints and that is rotatable in a circumferential direction, and
    wherein when the displacement detector has detected a position error that is an unexpected change of the position of the arm unit or an unexpected inclination of the arm unit, the arm unit controlling means is configured to cause the joints to absorb the position error so as to prevent the position error from being transmitted to a leading end of the arm unit.

2. The robot arm according to claim 1, wherein the displacement detector is disposed on an inside of the unmanned aerial vehicle or at the base end of the arm unit.

3. The robot arm according to claim 1, wherein the displacement detector is disposed at the leading end of the arm unit.

4. The robot arm according to claim 1,
wherein the arm unit comprises a plurality of link members connected to each other with the plurality of joints,
wherein the plurality of link members comprise, from the base end of the arm unit toward the leading end of the arm unit: a base connected to an airframe of the unmanned aerial vehicle; a shoulder; an upper arm; a lower arm; and a wrist that serves as the leading end of the arm unit,
wherein the shoulder is connected to the base rotatably in a circumferential direction relative to the base, and
wherein the shoulder and the upper arm, the upper arm and the lower arm, and the lower arm and the wrist are connected to each other with two of the joints swingable in directions orthogonal to each other.

5. The robot arm according to claim 1, further comprising an end effector mounted on the leading end of the arm unit, the end effector comprising image picking-up means for picking up an image of a work target of the end effector.

6. The robot arm according to claim 1, further comprising an end effector mounted on the leading end of the arm unit, the end effector comprising distance measuring means for measuring a distance to a work target of the end effector.

7. The robot arm according to claim 1, further comprising:
an end effector mounted on the leading end of the arm unit;
distance measuring means for measuring a distance to an object existing around an airframe of the unmanned aerial vehicle; and
obstacle avoiding means for controlling a posture of the arm unit to avoid a collision between an obstacle detected by the distance measuring means, and the arm unit and the end effector.

8. The robot arm according to claim 7, further comprising storing means for storing information with which a current posture of the arm unit is identifiable,
wherein based on the information stored in the storing means, the obstacle avoiding means is configured to determine whether the object detected by the distance measuring means is the obstacle, the arm, or the end effector.

9. The robot arm according to claim 7,
wherein when the object is gradually approaching the distance measuring means from a distance within a measured range of the distance measuring means, the obstacle avoiding means is configured to determine the object as the obstacle, and
wherein when the object has suddenly appeared in the measured range of the distance measuring means, the obstacle avoiding means is configured to determine the object as the arm or the end effector.

10. The robot arm according to claim 1,
wherein the arm unit comprises a plurality of link members connected to each other with the plurality of joints,
wherein at least one joint among the plurality of joints comprises a reinforcement joint comprising: a driving source configured to drive the at least one joint; a tapered member; and a connection member,
wherein the driving source is disposed in a first link member that is one link member among the plurality of link members,
wherein the tapered member is mounted on an output shaft of the driving source,
wherein a first tapered portion is formed on an outer surface of the tapered member, the first tapered portion having an approximately truncated cone shape such that an outer diameter dimension of the shape gradually decreases from a base end of the output shaft toward a leading end of the output shaft in an axis direction of the output shaft,
wherein the connection member comprises a second tapered portion having a shape complementary to the shape of the first tapered portion,
wherein the first tapered portion of the tapered member is engaged with the second tapered portion of the connection member,
wherein the connection member is fastened to the tapered member with a screw, and
wherein the connection member is fixed to a second link member that is another link member among the link members and that is next to the first link member.

11. The robot arm according to claim 10,
wherein the reinforcement joint further comprises a bearing member,
wherein an outer surface of the connection member is rotatably supported by the bearing member, and
wherein the bearing member is fixed to the first link member.

12. The robot arm according to claim 1,
wherein the arm unit comprises a plurality of link members connected to each other with the plurality of joints,
wherein at least one link member among the plurality of link members comprises a plate material made of a CFRP (Carbon Fiber Reinforced Plastics), and
wherein the at least one link member has a skeleton shape with an internal substance reduced to a framework.

13. The robot arm according to claim 1, further comprising an end effector mounted on the leading end of the arm unit,
wherein the end effector comprises a pair of claws that form a ring shape when the pair of claws are closed,
wherein at least one of the pair of claws comprises a movable claw rotationally movable about a base end of the at least one claw,
wherein the pair of claws are openable and closable at leading ends of the pair of claws by rotationally moving the movable claw,
wherein the leading ends of the pair of claws are located at different positions in a thickness direction of the pair of claws,
wherein when the pair of claws are closed, the leading ends of the pair of claws are overlapped with each other in a circumferential direction of the ring shape,
wherein depressions are located at portions of the leading ends of the pair of claws that correspond to an inner portion of the ring shape, the depressions being depressed outward on the ring shape, and
wherein the depressions are located at same positions in the circumferential direction of the ring shape.

14. The robot arm according to claim 1,
wherein at least one joint among the plurality of joints comprises a servo motor serving as a driving source configured to swing the at least one joint,
wherein while the unmanned aerial vehicle is making a horizontal flight, the arm controlling means is configured to: orient a swaying motion control joint such that the swaying motion control joint is swingable in a direction in which the unmanned aerial vehicle progresses, the swaying motion control joint being one of the joints and including the servo motor; and orient a suspending support portion of the arm unit downward in a linear manner from the swaying motion control joint, the suspending support portion being located at a side of the leading end of the arm unit relative to the swaying motion control joint, and
wherein upon stopping of the horizontal flight of the unmanned aerial vehicle, the arm controlling means is configured to gradually increase a holding property of the servo motor of the swaying motion control joint so as to quickly alleviate a swaying motion of the suspending support portion.

15. An unmanned aerial vehicle comprising:
a plurality of rotary wings; and
the robot arm according to claim 1.

* * * * *